US012490972B2

(12) United States Patent
Hustedt et al.

(10) Patent No.: US 12,490,972 B2
(45) Date of Patent: Dec. 9, 2025

(54) ALL-SUTURE ANCHOR

(71) Applicant: RESPONSIVE ARTHROSCOPY, LLC, Minneapolis, MN (US)

(72) Inventors: Jacob Hustedt, Sandy, UT (US); Kimberly Bahoora, Medina, MN (US)

(73) Assignee: Responsive Arthroscopy, Inc., Minneapolis, MN (US)

( * ) Notice: Subject to any disclaimer, the term of this patent is extended or adjusted under 35 U.S.C. 154(b) by 164 days.

(21) Appl. No.: 18/335,069

(22) Filed: Jun. 14, 2023

(65) Prior Publication Data

US 2023/0320722 A1 Oct. 12, 2023

Related U.S. Application Data

(63) Continuation of application No. PCT/US2022/076143, filed on Sep. 8, 2022.

(Continued)

(51) Int. Cl.

*A61B 17/04* (2006.01)
*A61F 2/08* (2006.01)
*A61B 17/00* (2006.01)

(52) U.S. Cl.

CPC ........ *A61B 17/0469* (2013.01); *A61F 2/0811* (2013.01); *A61B 2017/00367* (2013.01); *A61B 2017/0409* (2013.01); *A61F 2002/0829* (2013.01); *A61F 2002/0864* (2013.01); *A61F 2002/0888* (2013.01)

(58) Field of Classification Search

CPC ...... A61B 17/0469; A61B 2017/00367; A61B 2017/0409; A61F 2/0811

See application file for complete search history.

(56) References Cited

U.S. PATENT DOCUMENTS 5,464,426 A * 11/1995 Bonutti .............. A61B 17/0401 606/232
5,549,630 A * 8/1996 Bonutti .............. A61B 17/0401 606/232

(Continued)

FOREIGN PATENT DOCUMENTS

WO WO-2023039494 A1 3/2023

OTHER PUBLICATIONS

PCT/US2022/076143 International Search Report and Written Opinion mailed Jan. 31, 2023.

*Primary Examiner* — Phong Son H Dang
(74) *Attorney, Agent, or Firm* — Goodwin Procter LLP

(57) ABSTRACT

Provided herein are suturing systems, methods of anchoring to a bone, methods for anchoring a soft tissue to a bone, and methods of anchoring a first soft tissue portion to a second soft tissue portion. An exemplary suturing system includes an anchor and a suture inserter device. The anchor includes a plurality of anchor inserts coupled to a portion of the suture between a first end and second end of the anchor. The anchor has an insertion configuration that is substantially linear and a deployed configuration that is at least partially nonlinear. The suture inserter device includes a housing comprising a housing lumen and a housing shaft disposed therein, and an inserter fork coupled to the housing shaft. The housing shaft is axially translatable, and the inserter fork is axially translatable, via the housing shaft, between a distal position and a proximal position.

20 Claims, 25 Drawing Sheets

Related U.S. Application Data

(60) Provisional application No. 63/368,397, filed on Jul. 14, 2022, provisional application No. 63/364,247, filed on May 5, 2022, provisional application No. 63/242,443, filed on Sep. 9, 2021.

(56) References Cited

U.S. PATENT DOCUMENTS

| | | | | |
|---|---|---|---|---|
| 5,702,397 | A * | 12/1997 | Goble | A61F 2/0811<br>606/86 R |
| 7,799,073 | B2 * | 9/2010 | Khalapyan | A61F 2/2445<br>623/2.37 |
| 10,285,684 | B2 * | 5/2019 | Spenciner | A61B 17/06166 |
| 11,154,292 | B2 * | 10/2021 | Meister | A61B 17/0401 |
| 2005/0228448 | A1 * | 10/2005 | Li | A61B 17/0401<br>606/232 |
| 2006/0106423 | A1 * | 5/2006 | Weisel | A61B 17/0401<br>606/232 |
| 2011/0022084 | A1 * | 1/2011 | Sengun | A61B 17/0401<br>606/228 |
| 2011/0270278 | A1 * | 11/2011 | Overes | A61B 17/0487<br>606/228 |
| 2013/0110165 | A1 | 5/2013 | Burkhart et al. | |
| 2015/0250471 | A1 | 9/2015 | Nason et al. | |
| 2018/0368835 | A1 * | 12/2018 | Berberich | A61B 17/0401 |
| 2019/0046178 | A1 | 2/2019 | McDevitt et al. | |
| 2023/0255616 | A1 * | 8/2023 | Carpenter | A61B 17/0487<br>606/232 |

* cited by examiner

ALL-SUTURE ANCHOR

CROSS-REFERENCE TO RELATED APPLICATIONS

This application is a continuation of International Application No. PCT/US2022/076143 titled "All-Suture Anchor" and filed on Sep. 8, 2022, which claims the benefit and priority to U.S. Provisional Patent Application No. 63/242,443 titled "All-Suture Anchor" and filed on Sep. 9, 2021, U.S. Provisional Patent Application No. 63/364,247 titled "All-Suture Anchor" and filed on May 5, 2022, and U.S. Provisional Patent Application No. 63/368,397, titled "All-Suture Anchor" and filed on Jul. 14, 2022, each of which is hereby incorporated by reference herein in its entirety.

BACKGROUND

The complete or partial detachment of ligaments, tendons and/or other soft tissues from their associated bones within the body are relatively commonplace injuries, particularly among athletes. Tissue detachment may occur as the result of an accident such as a fall, over-exertion during a work-related activity, during the course of an athletic event, or in any one of many other situations and/or activities.

In the case of a partial detachment, the injury will frequently heal itself, if given sufficient time and if care is taken not to expose the injury to further undue stress. In the case of complete detachment, however, surgery may be needed to re-attach the soft tissue to its associated bone or bones. Hip, shoulder, and rotator cuff repair procedures require the fastening of soft tissue to bone. Suture anchors provide one type of device that may be used in helping to re-attach soft tissue to its associated bone or bones.

SUMMARY

One aspect provided herein is a suturing system comprising: a) an anchor comprising: i) a suture having a first end and a second end; and ii) a plurality of anchor inserts coupled to a portion of the suture between the first end and the second end; wherein the anchor has an insertion configuration that is substantially linear and a deployed configuration that is at least partially nonlinear; and b) a suture inserter device comprising: a housing comprising i) a housing lumen and a housing shaft disposed therein, wherein the housing shaft is axially translatable; and ii) an inserter fork coupled to the housing shaft, wherein the inserter fork is axially translatable, via the housing shaft, between a distal position and a proximal position; wherein the plurality of anchor inserts are linked together, and wherein the plurality of inserts comprise a leading anchor insert that is configured to be displaced via the suture or a deployment suture, so as to transition the anchor from the insertion configuration to the deployed configuration.

In some embodiments, the housing shaft has a shaft threaded portion, wherein the housing lumen has a lumen threaded portion complimentary to the shaft threaded portion, and wherein the housing shaft is axially translatable with respect to the housing lumen by rotating the shaft portion with respect to the lumen threaded portion. In some embodiments, the suturing inserter device further comprises a handle rotatably coupled to the housing shaft, wherein the handle has a handle threaded portion complimentary to the shaft threaded portion, and wherein the shaft is axially translatable with respect to the housing lumen by rotating the handle with respect to the housing shaft. In some embodiments, the handle comprises a knurl, a knob, a textured surface, or any combination thereof.

In some embodiments, the plurality of anchor inserts together, when in the insertion configuration or the deployed configuration, span an outer width of less than about 5 mm. In some embodiments, the plurality of anchor inserts comprises a first anchor insert, a second anchor insert, and a link therebetween. In some embodiments, the first anchor insert and the second anchor insert are disposed in a substantially linear configuration from the first end to the second end of the suture when in the insertion configuration, and wherein the first anchor insert and the second anchor insert are disposed in a substantially non-linear configuration when in the deployed configuration. In some embodiments, the link changes shape from substantially linear configuration to substantially nonlinear in the deployed configuration of the anchor. In some embodiments, the anchor inserts are aligned in two or more rows when in the deployed configuration. In some embodiments, the first end of the suture is proximal to at least a portion of the plurality of anchor inserts when the anchor is in the insertion configuration. In some embodiments, the link comprises the suture.

In some embodiments, each anchor insert has a shape comprising a sphere, a cylinder, a pyramid, a torus, a cone, a prism, or any combination thereof. In some embodiments, each anchor insert is a suture knot. In some embodiments, the plurality of anchor inserts comprises 2, 3, 4, 5, 6, 7, 8 or more anchor inserts. In some embodiments, the inserter fork is disposed within an inserter lumen of an inserter sized to receive at least one of the first anchor insert and the second anchor insert. In some embodiments, the inserter comprises an inserter lumen therethrough, and wherein inserter lumen is sized to receive the first end of the suture the second end of the suture, or both.

Another aspect described herein is a suturing system comprising: a) an anchor assembly comprising: i) a suture; ii) a first anchor coupled to a distal portion of the suture; and iii) a second anchor coupled to the suture proximal to the first anchor; and b) a suture inserter device comprising: i) a housing comprising a housing lumen therethrough and a first needle, wherein the first anchor couples to the first needle, wherein the first needle is axially translatable within the housing lumen between a primary configuration and a secondary configuration; and ii) a second needle receiving a portion of the suture proximal to the first anchor and distal to the second anchor.

In some embodiments, the first anchor comprises a plurality of first anchor inserts, and wherein the second anchor comprises a plurality of second anchor inserts. In some embodiments, at least two of the plurality of first anchor inserts are coupled, wherein at least two of the plurality of first anchor inserts are coupled, or both. In some embodiments, at least a portion of the plurality of first anchor inserts, plurality of second anchor inserts, or both, have a shape comprising a sphere, a cylinder, a pyramid, a torus, a cone, a prism, or any combination thereof. In some embodiments, at least a portion of the plurality of first anchor inserts, the plurality of second anchor inserts, or both, comprise 3, 4, 5, 6, 7, 8 or more anchor inserts. In some embodiments, the housing, the first needle, the second needle, or a combination thereof, comprise an indicator of the distance between the distal point of the housing lumen and the distal point of the first needle and/or the second needle. In some embodiments, the suture inserter device further comprises a needle slider coupled to the first needle, wherein the first needle slider translates the first needle within the housing lumen between the primary configuration and the secondary configuration. In some embodiments, each anchor has an outer width or diameter of less than about 5 mm.

Another aspect described herein, is a suturing system comprising: a) an anchor assembly comprising: i) a suture; ii) a first anchor coupled to a distal portion of the suture; and iii) a second anchor coupled to the suture proximal to the first; and b) a suture inserter device comprising: i) a housing comprising a first housing lumen and a second housing lumen therethrough; ii) a first needle translatable within the first housing lumen between a first primary configuration and a first secondary configuration, wherein the first anchor couples to the first needle; and iii) a second needle translatable within the second housing lumen between a second primary configuration and a second secondary configuration, wherein the second needle is sized to receive a portion of the suture proximal to the anchor.

In some embodiments, the first anchor comprises a plurality of first anchor inserts, and wherein the second anchor comprises a plurality of second anchor inserts. In some embodiments, at least two of the plurality of first anchor inserts are coupled, wherein at least two of the plurality of first anchor inserts are coupled, or both. In some embodiments, at least a portion of the plurality of first anchor inserts, plurality of second anchor inserts, or both, have a shape comprising a sphere, a cylinder, a pyramid, a torus, a cone, a prism, or any combination thereof. In some embodiments, at least a portion of the plurality of first anchor inserts, the plurality of second anchor inserts, or both, comprise 3, 4, 5, 6, 7, 8 or more anchor inserts. In some embodiments, the housing, the first needle or both, comprise an indicator of the distance between the distal point of the first housing lumen and the distal point of the first needle. In some embodiments, the housing, the second needle or both, comprise an indicator of the distance between the distal point of the second housing lumen and the distal point of the second needle. In some embodiments, the suture inserter further comprises a first needle inserter coupled to the needle, wherein the first needle inserter translates the first needle within the first housing lumen between the first primary configuration and the first secondary configuration. In some embodiments, the suture inserter further comprises a second needle slider coupled to the second needle, wherein the second needle inserter translates the second needle within the housing lumen between the second primary configuration and the second secondary configuration. In some embodiments, each anchor has an outer width or diameter of less than about 5 mm.

Another aspect described herein is a method of anchoring to a bone, the method comprising: a) receiving the suturing system of any suture system described herein; b) inserting the inserter and the anchor into a hole partially in a bone hole of the bone, wherein the anchor is in the insertion configuration; c) applying proximal tension to the first end of the suture or the deployment suture to transition the anchor from the insertion configuration to the deployed configuration; and d) axially translating the inserter with respect to the housing shaft from the distal position to the proximal position.

In some embodiments, the method further comprises trimming the suture, tightening the suture, locking the suture, or any combination thereof. In some embodiments, the hole in the bone has a depth of less than about 35 mm. In some embodiments, the hole in the bone has an inner diameter of less than about 5 mm. In some embodiments, an outer diameter of the housing is greater than the inner diameter of the hole.

Another aspect described herein is a method of suturing a first soft tissue portion to a second soft tissue portion, the method comprising: a) receiving the suturing system of any suture system described herein; b) piercing the first soft tissue portion at a first side thereof with the first needle in the primary configuration, and thereby passing the first anchor through the first soft tissue portion to a second side thereof; c) translating the first needle within the first housing lumen to the secondary configuration, thereby retracting the first needle, and leaving the first anchor displaced at the second side of the first soft tissue portion; d) piercing the second soft tissue portion at a first side thereof with the second needle, and thereby passing the second anchor through the second soft tissue portion to a second side thereof; e) tensioning the suture so as to transition the first anchor and the second from the insertion configuration to the deployed configuration; and f) extracting the second needle from the second soft tissue portion.

In some embodiments, the method further comprises trimming the suture, tightening the suture, locking the suture, or any combination thereof. In some embodiments, the first portion of the soft tissue is a portion of a first soft tissue, and wherein the second soft tissue portion is a portion of a second soft tissue.

Another aspect described herein is a method of suturing a first soft tissue portion to a second soft tissue portion, the method comprising: a) receiving the suturing system of any suture system described herein; b) piercing the first soft tissue portion at a first side thereof with the first needle in the primary configuration, and thereby passing the first anchor through the first soft tissue portion to a second side thereof; c) translating the first needle within the first housing lumen to the first secondary configuration, thereby retracting the first needle, and leaving the first anchor displaced at the second side of the first soft tissue portion; d) piercing the second soft tissue portion at a first side thereof with the second needle, and thereby passing the second anchor through the second soft tissue portion to a second side thereof e) tensioning the suture so as to transition the first anchor and the second from the insertion configuration to the deployed configuration and f) translating the second needle within the second housing lumen to the second secondary configuration, thereby retracting the second needle, and leaving the second anchor displaced at the second side of the first soft tissue.

In some embodiments, the method further comprises trimming the suture, tightening the suture, locking the suture, or any combination thereof. In some embodiments, (e) is performed before (d). In some embodiments, the method further comprises translating the second needle within the secondary housing lumen to the primary configuration, before or after (f). In some embodiments, (e) is performed after (f).

Another aspect, described herein, is a suturing system comprising: a) a passing suture having a primary end and a secondary end; b) an anchor comprising: 1) a repair suture having a first end, and a second end, the repair suture having a hollow interior at least partially along said repair suture between the first and second openings, such that the passing suture is configured to be at least partially inserted within said hollow interior; and 2) a plurality of anchor inserts coupled to a portion of the repair suture either i) at or about the first end, or ii) between the first end and the second end;

wherein the anchor has an insertion configuration that is substantially linear and a deployed configuration that is at least partially nonlinear; and c) a suture inserter device comprising: 1) a housing comprising a housing lumen and a housing shaft disposed therein, wherein the housing shaft is axially translatable; and 2) an inserter fork coupled to the housing shaft, wherein the inserter fork is axially translatable, via the housing shaft, between a distal position and a proximal position; wherein the plurality of anchor inserts are linked together, and wherein the plurality of inserts comprise a leading anchor insert that is configured to be displaced via the repair suture or a deployment suture, so as to transition the anchor from the insertion configuration to the deployed configuration; and wherein the primary end of the passing suture is configured to couple with the second end of the repair suture, such that second end is configured to be inserted and pulled through the hollow interior via the passing suture, thereby securing a portion of the repair suture within itself.

In some embodiments, the hollow interior spans a distance from about 0.5 mm to about 50 mm along the repair suture. In some embodiments, the repair suture comprises a #2 suture. In some embodiments, the passing suture comprises a #2-0 suture.

In some embodiments, the housing shaft has a shaft threaded portion, wherein the housing lumen has a lumen threaded portion complimentary to the shaft threaded portion, and wherein the housing shaft is axially translatable with respect to the housing lumen by rotating the shaft portion with respect to the lumen threaded portion. In some embodiments, the suture inserter device further comprises a handle rotatably coupled to the housing shaft, wherein the handle has a handle threaded portion complimentary to the shaft threaded portion, and wherein the shaft is axially translatable with respect to the housing lumen by rotating the handle with respect to the housing shaft. In some embodiments, the handle comprises a knurl, a knob, a textured surface, or any combination thereof.

In some embodiments, the plurality of anchor inserts together, when in the insertion configuration or the deployed configuration, have span an outer width of less than about 5 mm. In some embodiments, the plurality of anchor inserts comprises a first anchor insert, a second anchor insert, and a link therebetween. In some embodiments, the first anchor insert and the second anchor insert are disposed in a substantially linear configuration from the first end to the second end of the suture when in the insertion configuration, and wherein the first anchor insert and the second anchor insert are disposed in a substantially non-linear configuration when in the deployed configuration. In some embodiments, the link changes shape from substantially linear configuration to substantially nonlinear in the deployed configuration of the anchor. In some embodiments, the anchor inserts are aligned in two or more rows when in the deployed configuration. In some embodiments, the second end of the repair suture is proximal to at least a portion of the plurality of anchor inserts when the anchor is in the insertion configuration. In some embodiments, the link comprises the repair suture.

In some embodiments, each anchor insert has a shape comprising a sphere, a cylinder, a pyramid, a torus, a cone, a prism, or any combination thereof. In some embodiments, each anchor insert is a suture knot. In some embodiments, the plurality of anchor inserts comprises 2, 3, 4, 5, 6, 7, 8 or more anchor inserts. In some embodiments, the inserter fork is disposed within an inserter lumen of an inserter. In some embodiments, the inserter comprises an inserter lumen therethrough, and wherein inserter lumen is sized to receive the first end of the suture the second end of the suture, or both. In some embodiments, the primary end of the passing suture comprises a suture loop.

Another aspect, described herein, is a method of anchoring to a bone, the method comprising: a) receiving the suturing system of any knotless suture system or device described herein, wherein the passing suture is inserted at least partially within the hollow interior; b) inserting the inserter and the anchor into a hole partially in a bone hole of the bone, wherein the anchor is in the insertion configuration; c) applying proximal tension to the second end of the suture or the deployment suture to transition the anchor from the insertion configuration to the deployed configuration; and d) axially translating the inserter with respect to the housing shaft from the distal position to the proximal position.

In some embodiments, the method comprises coupling the second end with the primary end of the passing suture; and applying proximal tension to the secondary end of the passing suture, such that the second end of the repair suture is pulled through the hollow interior, such that a portion of the repair suture is disposed within the hollow interior.

In some embodiments, the method comprises trimming the second end of the suture and/or tightening the repair suture.

In some embodiments, the hole in the bone has a depth of less than about 35 mm. In some embodiments, the hole in the bone has an inner diameter of less than about 5 mm. In some embodiments, an outer diameter of the housing is greater than the inner diameter of the hole.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
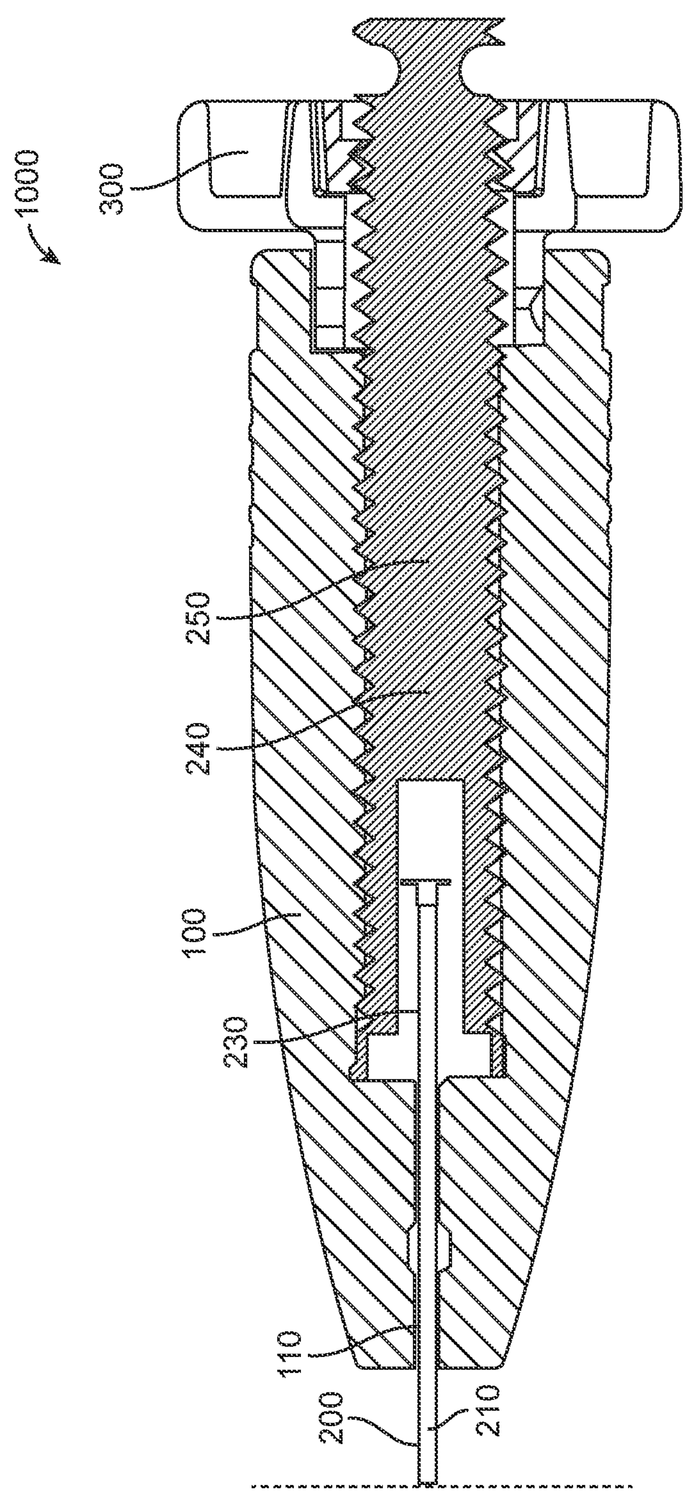
FIG. 1 shows a front cross-sectional view illustration of an exemplary first suturing system, per one or more embodiments herein.
Figure 2:
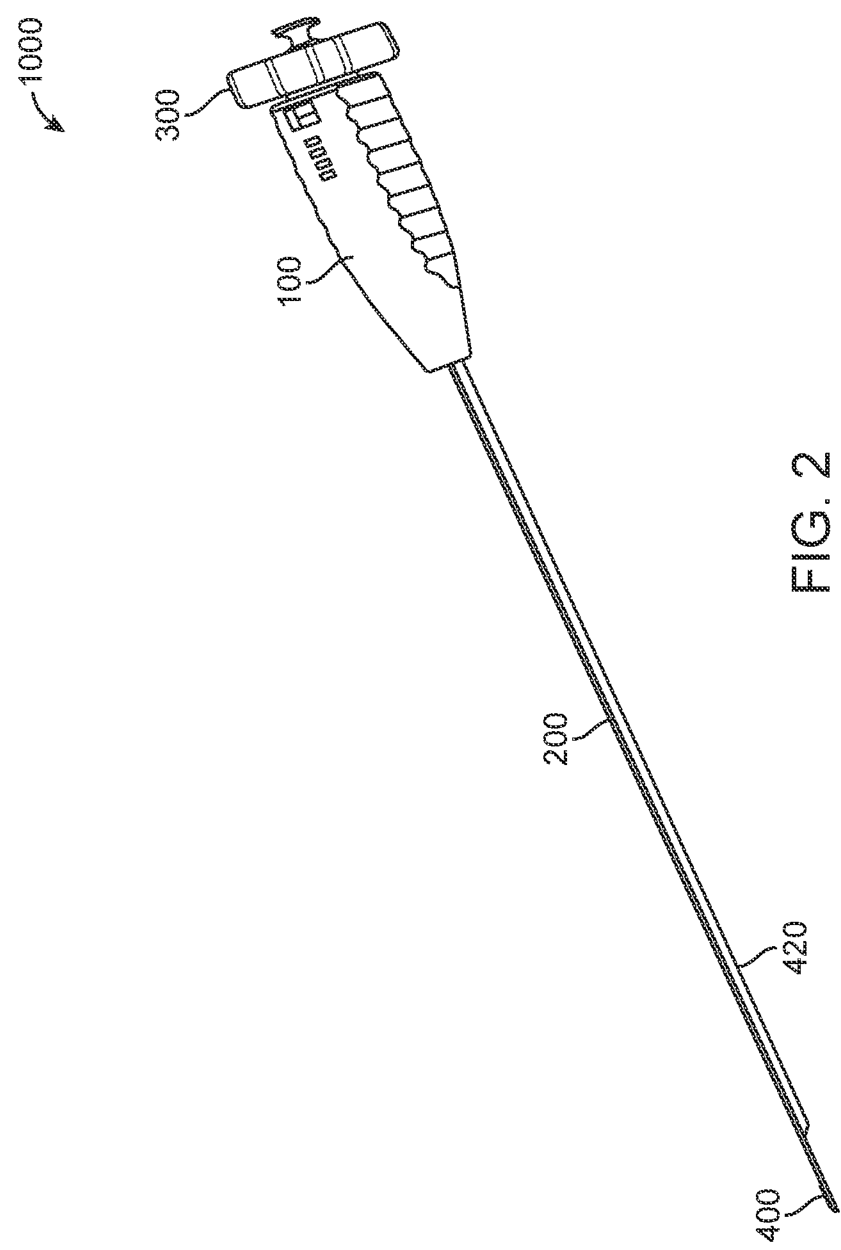
FIG. 2 shows a front-top-right perspective view illustration of an exemplary first suturing system, per one or more embodiments herein.

Provided herein are suturing systems and methods of anchoring soft tissue to a bone and/or for anchoring a soft tissue generally.

First Suturing System

One aspect provided herein, per FIGS. 1-6C, is a first suturing system. In some embodiments, the first suturing system is configured for operating on a shoulder, a hip, a foot, an ankle, an elbow, a hand, a wrist, or any combination thereof. In some embodiments, the first suturing system is configured for rotator cuff repair, bankart repair, slap lesion repair, biceps tenodesis, acromio-clavicular separation repair, deltoid repair, capsular shift, capsulolabral reconstruction, or any combination thereof of the shoulder. In some embodiments, the first suturing system is configured for lateral stabilization, medial stabilization, achilles tendon repair, hallux valgus reconstruction, mid-foot reconstruction, metatarsal ligament repair/tendon repair, bunionectomy, or any combination thereof of the foot. In some embodiments, the first suturing system is configured for lateral stabilization, medial stabilization, achilles tendon repair, hallux valgus reconstruction, mid-foot reconstruction, metatarsal ligament repair/tendon repair, bunionectomy, or any combination thereof of the ankle. In some embodiments, the first suturing system is configured for scapholunate ligament reconstruction, ulnar collateral ligament reconstruction, radial collateral ligament reconstruction, or any combination thereof of the hand. In some embodiments, the first suturing system is configured for scapholunate ligament reconstruction, ulnar collateral ligament reconstruction, radial collateral ligament reconstruction, or any combination thereof of the wrist. In some embodiments, the first suturing system is configured for biceps tendon reattachment, tennis elbow repair, ulnar or radial collateral ligament reconstruction, lateral epicondylitis repair, or any combination thereof of the elbow.

In some embodiments, the first suturing system comprises an anchor 400 and a suture inserter device 1000. In some embodiments, the anchor 400 comprises a suture 420 having a first end 421 and a second end 422, and an anchor insert 410. In some embodiments, the suture inserter device 1000 comprises a housing 100 and an inserter 200.

Figure 3A:
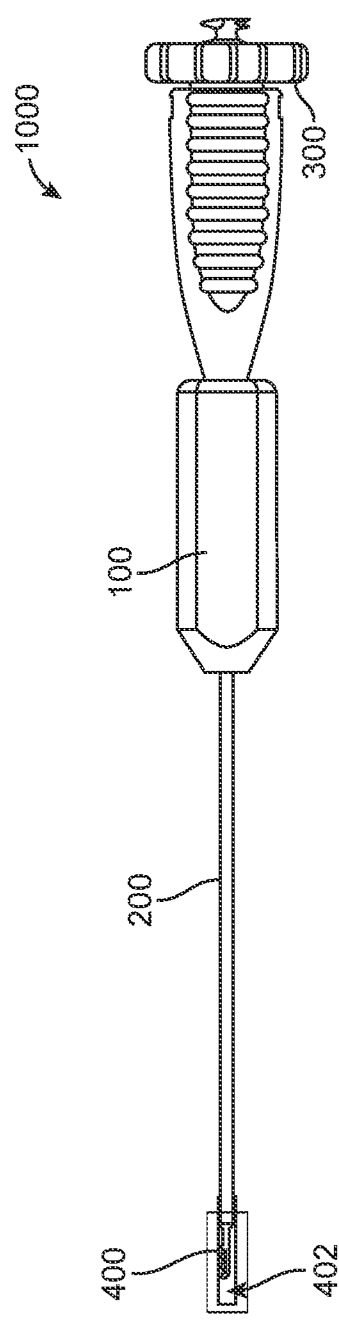
FIG. 3A shows a front view illustration of an exemplary first suturing system, wherein the inserter is in a distal position, per one or more embodiments herein.
Figure 3B:
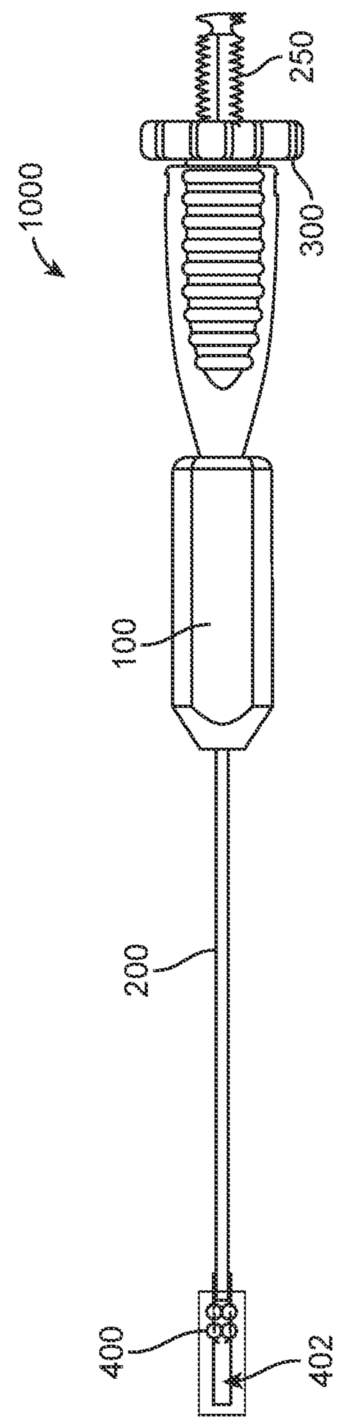
FIG. 3B shows a front view illustration of an exemplary first suturing system, wherein the inserter is in a proximal position, per one or more embodiments herein.
Figure 4A:
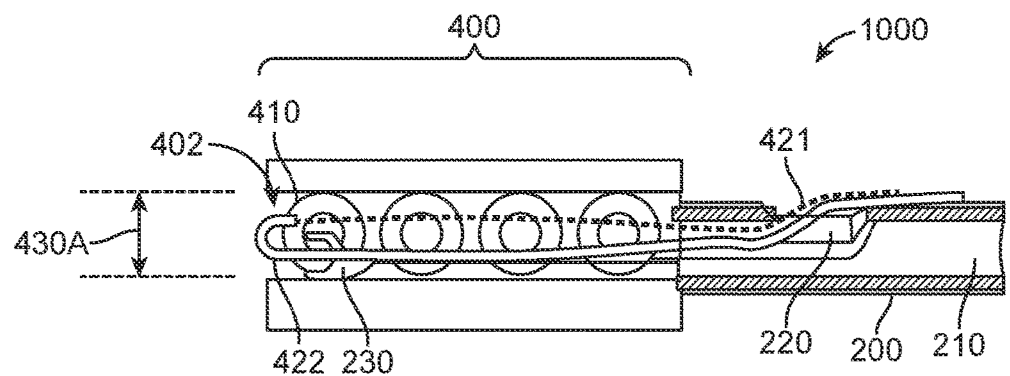
FIG. 4A shows a right cross-sectioned view illustration of an exemplary first suturing system, wherein the anchor is in an insertion configuration, per one or more embodiments herein.
Figure 4B:
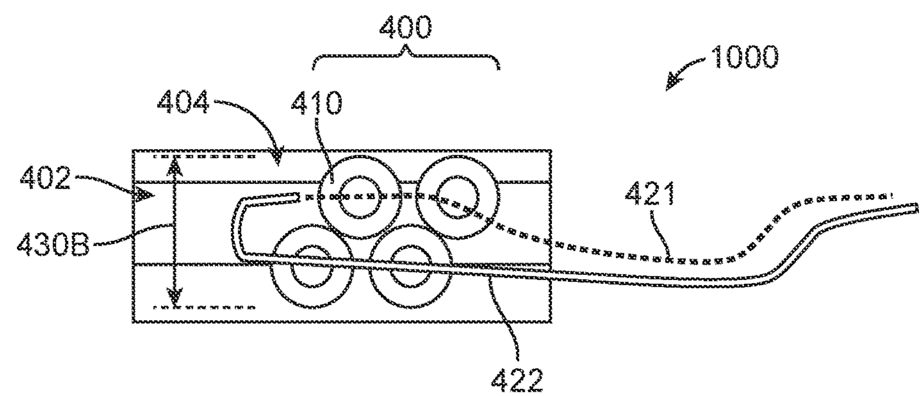
FIG. 4B shows a right cross-sectioned illustration of an exemplary first suturing system, wherein the anchor is in deployed configuration, per one or more embodiments herein.

In some embodiments, the anchor insert 410 is coupled to the suture 420 between the first end 421 and the second end 422 of the suture 420. In some embodiments, the anchor insert 410 is coupled to a mesial portion of the suture 420. In some embodiments, the anchor 400 has an insertion configuration, per FIG. 4A, and a deployed configuration, per FIG. 4B. In some embodiments, the anchor 400 comprises one or more anchor inserts 410. In some embodiments, per FIG. 4C, the anchor 400 comprises a first anchor insert 410 a second anchor insert 410 and a link therebetween. In some embodiments, the link comprises the suture 420. In some embodiments, the anchor inserts comprise one or more knots formed with a different suture from suture 420 (e.g., an anchor insert suture), wherein the anchor inserts may additionally or alternatively be linked via the anchor suture itself. In some embodiments, the anchor 400 changes from a substantially linear configuration (e.g., FIG. 4A) in the insertion configuration to a substantially nonlinear configuration (e.g., FIG. 4B) in the deployed configuration of the anchor 400. In some embodiments, the first anchor insert 410 is coupled to the second anchor insert 410 and is disposed serially between the first end 421 and the second end 422 of the suture 420 when the anchor 400 is in the insertion configuration. In some embodiments, at least two anchor inserts 410 are coupled to each other. In some embodiments, at least one anchor insert 410 is individually coupled to the suture 420. In some embodiments the plurality of anchor inserts 410 are substantially linear when the anchor 400 is in the insertion configuration to enable insertion within a bone hole or other tissue aperture. For example, as shown in some embodiments, the anchor inserts 410 are provided in a row when the anchor 400 is in the insertion configuration. In some embodiments, per FIG. 4B, the plurality of anchor inserts 410 are substantially non-linear when the anchor 400 is in the deployed configuration such that the anchor inserts 410 interlock within a bone hole (e.g., 402) or other tissue aperture. For example, as shown in FIG. 4B, in some embodiments, the anchor inserts 410 are provided in two or more rows when the anchor 400 is in the deployed configuration. In some embodiments, the anchor inserts 410, when in the deployed configuration, are arranged in any orientation and sequence with respect to each other. For example, FIG. 3B depicts the deployed configuration of the anchor inserts in two rows and two columns, with each anchor insert aligned with another anchor insert in the corresponding row or column. FIG. 4B depicts the deployed configuration with two rows of the anchor inserts, wherein the anchor inserts are not aligned in a column. In some embodiments, the anchor inserts, when in a deployed configuration, are arranged in a manner that resembles a diamond shape. Further, in some embodiments, the first end of the suture 421 is proximal to at least a portion of the anchor insert 410 when the anchor 400 is in the insertion configuration. In some embodiments, the suture 420 is referred to as a repair suture herein.

Figure 4C:
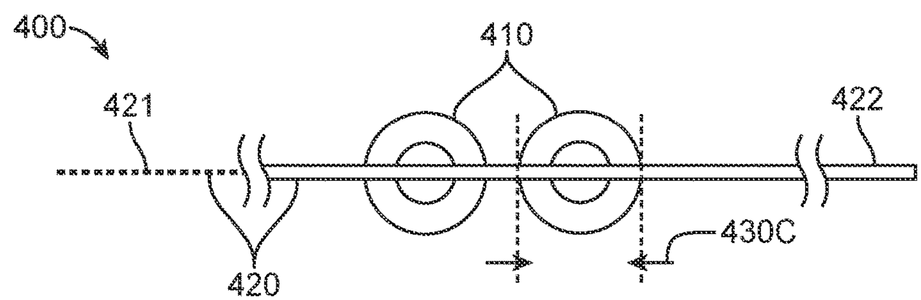
FIG. 4C shows a right view illustration of an exemplary anchor, per one or more embodiments herein.

In some embodiments, per FIG. 4C, the width 430C of any one anchor insert 410 is from about 0.1 mm to about 10 mm. In some embodiments, the width 430C of each individual anchor insert 410 is at most about 10, 9, 8, 7, 6, 5, 4, 3, 2, or 1 mm, including increments therein. In some embodiments, the width 430C of each individual anchor insert 410 is at least about 0.1, 1, 2, 3, 4, 5, 6, 7, 8, or 9 mm, including increments therein. In some embodiments, the outer width 430C of the anchor insert 410 is from about 0.1 mm to about 10 mm, or is at most about 10, 9, 8, 7, 6, 5, 4, 3, 2, or 1 mm, including increments therein. In some embodiments, the outer width 430C of the anchor insert 410 is from about 0.1 mm to about 10 mm, or is about 0.1, 1, 2, 3, 4, 5, 6, 7, 8, or 9 mm, including increments therein. Accordingly, in some embodiments, the outer width 430C of the anchor 400 in the insertion configuration (e.g., when the anchor is in a linear or substantially linear configuration) enables the anchor 400 to be inserted within the bone hole (e.g., 402) or other tissue aperture. As discussed herein, in some embodiments, the outer width 430A of the anchor inserts 410 (together) in the insertion configuration is configured to be approximately the outer width 430C, thickness, or diameter 430C of an individual anchor insert 410. In some embodiments, the outer width 430A of the anchor inserts 410 (together) in the insertion configuration corresponds to a lateral dimension relative to a longitudinal length of the anchor insert 410. In some embodiments, the outer width 430A of the anchor inserts 410 (together) in the insertion configuration is greater than, the same, or substantially the same diameter or width as a bone hole. Accordingly, in some embodiments, the anchor in the insertion configuration contacts the inner walls of a bone hole (as depicted in FIG. 4A). In some embodiments, the anchor in the insertion configuration provides a tight-fit or snug-fit interaction with the inner wall of the bone hole.

In some embodiments, the anchor 400 is configured to transition from the insertion configuration to a deployed configuration. In some embodiments, the deployed configuration comprises displacing the anchor inserts 410 such that the outer width 430B of the anchor inserts 410 (together) in the deployed configuration, along a lateral dimension compared to a longitudinal direction of a bone hole (e.g., FIG. 4B), is greater than the outer width 430A of the anchor inserts 410 (together) when the anchor 400 is in the insertion configuration. For example, in some embodiments, the plurality of anchor inserts 410 are aligned in two or more rows when the anchor 400 is in the deployed configuration (e.g., FIG. 4B). Accordingly, the outer width 430B of the anchor inserts 410 (together) in the deployed configuration with two rows (FIG. 4B) is greater than the outer width 430A of the anchor inserts 410 (together) arranged in one row (FIG. 4A). In some embodiments, the outer width 430C of the anchor 400 is measured as an outer diameter or an outer thickness. As described herein, in some embodiments, the anchor inserts is configured to push at least a portion of the inner wall defining a bone hole when transitioning from the insertion configuration to the deployed configuration (see FIG. 4B for example).

In some embodiments, the outer width 430A of the anchor inserts 410 (together) in the insertion configuration is greater than, the same, or substantially the same diameter or width as a bone hole. Accordingly, in some embodiments, in some embodiments, the anchor inserts 410 in the insertion configuration contacts the inner walls of a bone hole. In some embodiments, the anchor inserts 410 in the insertion configuration provide a tight-fit or snug-fit interaction with the inner wall of the bone hole. Accordingly, in some embodiments, transitioning the anchor from an insertion configuration to a deployed configuration results in the anchor inserts pushing against the inner walls of the bone hole (for example, see FIG. 4B). In some embodiments, the anchor inserts in the deployed configuration push the bone hole walls to accommodate having a substantially non-linear configuration. For example, in some cases, the anchor inserts contact an inner wall of the bone hole that can be articulated to allow the anchor inserts extend at least partially beyond a bone hole width (e.g., see FIG. 3B, 4B). In some cases, the inner wall includes a thickness (e.g., 404) that is at least partially malleable, as opposed to a portion of the bone beyond said thickness, which may be more dense and thus more difficult to for the anchor inserts to push when transitioning to a deployed configuration (e.g., cortical region of bone).

Accordingly, in some embodiments, when the one or more anchor inserts 410 are arranged in a substantial linear configuration in the insertion position, the outer width 430A of the anchor inserts 410 (together), along a lateral dimension compared to a longitudinal direction of a bone hole (e.g., FIG. 4A), is from about 0.1 mm to about 10 mm. In some embodiments, the outer width 430C of the one or more anchor inserts 410 is greater than an inner diameter of an inserter lumen (e.g., see 210 in FIG. 4A/4B). Accordingly, in some embodiments, the one or more anchor inserts will abut the walls of the inserter 200 (e.g., when the inserter fork 230 is retracted into inserter lumen 210).

In some embodiments, the outer diameter 430B of the anchor inserts 410 (together) in the deployed configuration is greater than a diameter of a bone hole, an opening to the bone hole, and/or an opening to a tissue as described herein (where a surgical procedure is being performed). Accordingly, in some embodiments, the anchor inserts 410 when the anchor 400 is in the deployed configuration are pressed against an inner wall of a bone wall, thereby providing tension of the suture 420. Accordingly, in some embodiments, after the anchor 400 has been inserted within a bone hole opening or tissue opening in the insertion configuration, the pull out strength of the anchor 400 (i.e. a force required to pull the anchor 400 out through the bone hole opening or tissue opening) significantly increases in the deployed configuration as compared to the insertion configuration. In some embodiments, the pull out strength of the anchor 400 in the deployed configuration within a bone hole is from about 5 psi to about 40 psi. In some embodiments, the pull out strength of the anchor 400 within a bone hole is from about 15 psi to about 25 psi.

In some embodiments, one or more anchor inserts 410 have a shape comprising a circle, sphere, a cylinder, a pyramid, a torus, a cone, a prism, or any combination thereof. In some embodiments, one or more anchor inserts 410 is a suture 420 knot. In some embodiments, one or more anchor inserts 410 comprise knots in a suture different from suture 420 (as described herein, for e.g., see anchor suture). In some embodiments, one or more of the anchor inserts 410 comprise a hollow structure. In some embodiments, the suture 420 passes through each of the hollow structures of such anchor inserts 410 (e.g., FIGS. 4A-4C). In some embodiments, one or more of the anchor inserts 410 comprise a solid structure (e.g., FIGS. 4A-4C). In some embodiments, the suture 420 is affixed to each of the solid structures of such anchor inserts 410. In some embodiments, each of the solid structures of the anchor inserts 410 are tethered to a common loop that is also coupled to the suture 420, thereby operatively coupling the suture 420 to said anchor inserts 410. In some embodiments, the one or anchor inserts 410 comprise one or more knots of the suture 420 or another suture (as described herein). In some embodiments, the one or more anchor inserts 410 comprise suture 420 balls, or other balls. In some embodiments, the one or more anchor inserts 410 comprise cylindrical, oval and/or disk shapes. In some embodiments, for any anchor herein, the anchor inserts 410 comprise any shape, such as spherical, cylindrical, oval, disk, triangular, square, or any non-uniform shape.

In some embodiments, the depth of a bone hole required to be drilled is at least partially dependent on the number of anchor inserts 410 on the anchor 400. In some embodiments, increasing the number of anchor inserts 410 provides an increased pull out strength of the anchor 400 when in the deployed configuration. In some embodiments, reducing the number of anchor inserts 410 in the anchor 400 reduces or limits the depth of the bone hole needed to contain the anchor inserts 410. In some embodiments, the number of anchor inserts 410 in the anchor 400 is optimized depending on the anatomical portion being targeted, so as to balance the required bone drill depth and pull out strength. In some embodiments, the plurality of anchor inserts 410 comprises 3, 4, 5, 6, 7, 8 or more anchor inserts 410. In some embodiments, the depth of the bone hole using a suturing system described herein is from about 10 mm to about 30 mm. For example, in some embodiments, the depth of the bone hole using a suturing system comprising four anchor inserts 410 for a shoulder/hip labral repair is about 15 mm to about 20 mm, or less. In another example, in some embodiments, the depth of the bone hole using a suturing system comprising four anchor inserts 410 for a rotator cuff repair is about 22 mm to about 28 mm, or less. In some embodiments, the outer width of the anchor insert 410 is greater than the drill diameter of the bone hole, which may be at most about 2-4 mm for a shoulder/hip labral repair. In another example, the outer width of the anchor insert 410 is greater than the drill diameter of the bone hole, which may be at most about 3-5 mm for a shoulder/hip labral repair.

Figure 22:
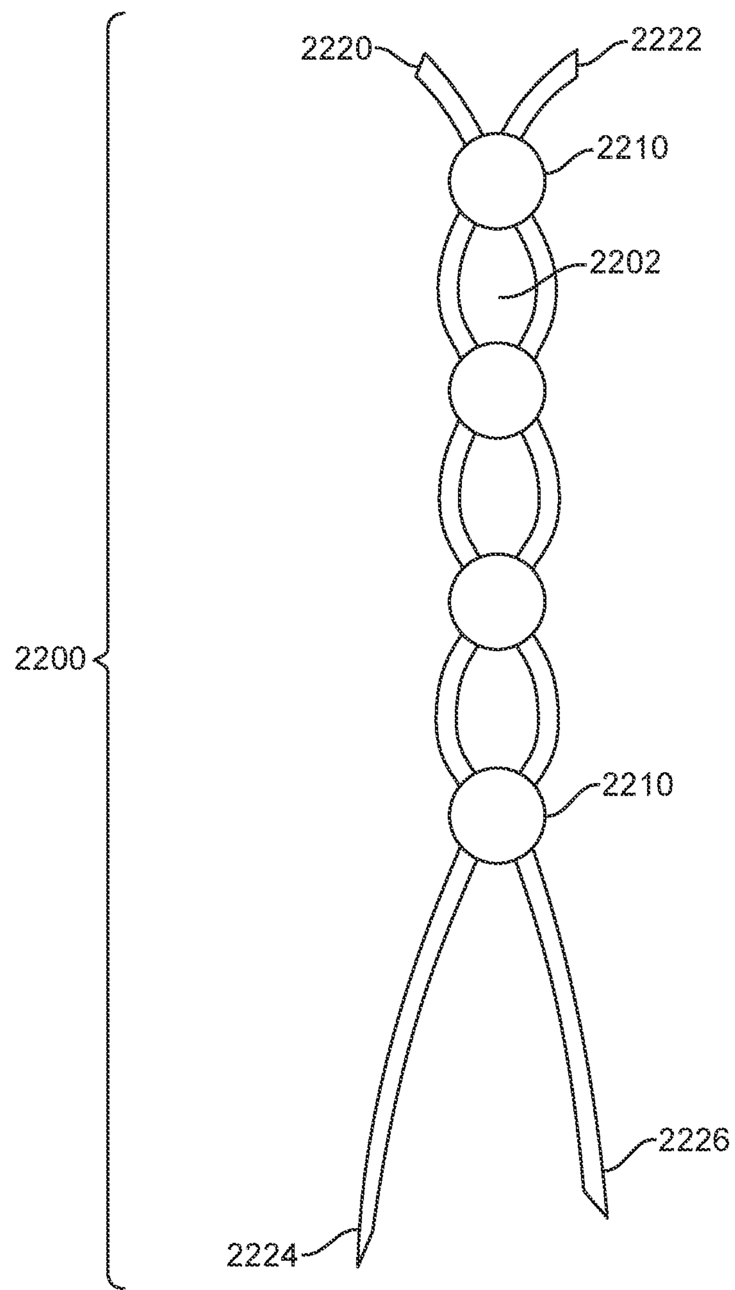
FIG. 22 shows an illustration of another anchor in an insertion configuration comprising a plurality of sutures, a plurality of anchor inserts, and a plurality of loops between the anchor inserts.

FIG. 22 depicts another exemplary embodiment of an anchor 2200 having been configured for any suturing system described herein. In some embodiments, the anchor comprises a plurality of anchor inserts 2210. In some embodiments, the anchor 2200 comprises two sutures 2220, 2222, that form the one or more anchor inserts 2210. In some embodiments, the two sutures 2220, 2222 are configured to form a loop 2202 or chain between the anchor inserts 2210. In some embodiments, the anchor 2200 is arranged in a braided configuration. In some embodiments, one or both distal ends 2224, 2226 of each suture 2220, 2222 is configured to be weaved back through (not shown) one or more loops 2202 between each anchor insert 2210. In some embodiments, pulling on one or both of the distal ends 2224, 2226 after being weaved through the one or more loops 2202 allows the anchor to transition from an insertion configuration to a deployed configuration. In some embodiments, the anchor 2200 comprises a single suture.

Figure 23A:
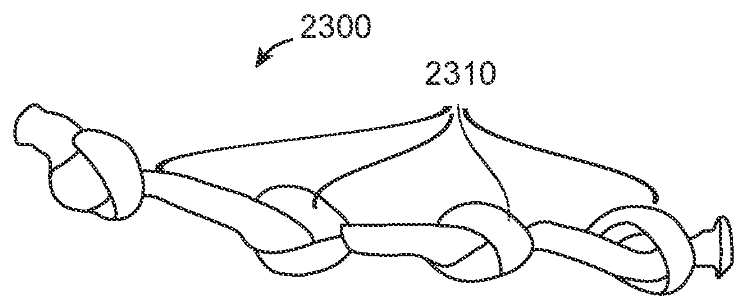
FIG. 23A shows an illustration of an exemplary anchor with a plurality of anchor inserts in an insertion configuration, per one or more embodiments herein.
Figure 23B:
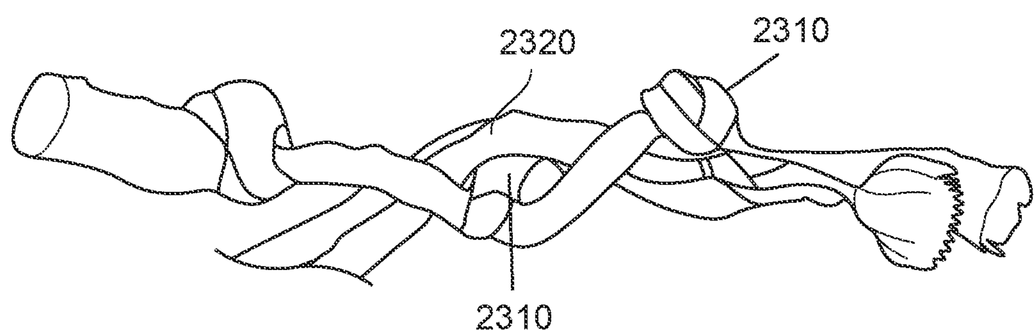
FIG. 23B shows an illustration of a repair suture weaved through the exemplary anchor from FIG. 23A while in the insertion configuration, per one or more embodiments herein.
Figure 23C:
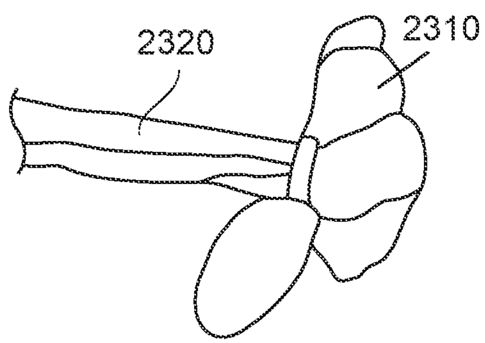
FIG. 23C show an illustration of the repair suture weaved through the exemplary anchor from FIG. 23A while in the deployed configuration, per one or more embodiments herein.

FIGS. 23A-23C depict another exemplary embodiment of an anchor 2300 having been configured for any suturing system described herein. In some embodiments, the anchor 2300 does not include an anchor insert having an fixed central opening. In some embodiments, the anchor 2300 may include one or more anchor inserts 2310 that can allow a repair suture 2320 (for example) to weave through, as shown in FIG. 23B. In some embodiments, the repair suture 2320 weaves through the anchor inserts (which may comprises "suture knots" on a separate suture). In some embodiments, the repair suture 2320 passes through the anchor inserts (e.g., through the actual inserts or knots). In some embodiments, the repair suture 2320 weaves past at least some of the anchor inserts, but is passed through the most distal anchor insert (e.g., anchor insert located furthest from a bone hole opening). In some embodiments, the repair suture 2320 is disposed within an inserter, such that when the repair suture 2320 has been inserted through one or more inserts (e.g., knots) 2310, the repair suture 2320 can be pulled so as to transition the anchor 2300 from an insertion configuration to the deployed configuration, as shown in FIG. 23C.

For any embodiment herein, the anchor insert (e.g., 410, 1910, 2210, 2310, etc.) may be of any shape. For example, the anchor insert for any embodiment of an anchor described herein may be spherical, round, oval, ellipsoidal, rectangular, square, triangular, polygonal, or any combination thereof.

For any embodiment of an anchor (e.g., 400, 1900, 2200, 2300) described herein, the anchor may be manufactured according to any automated process known in the art. For example, the anchor may be manufactured using a braiding machine. In some embodiments, for any embodiment of anchor described herein, the anchor may be at least partially manufactured by hand.

With reference to FIG. 1, FIGS. 3A-3B, and FIGS. 5A-5C, in some embodiments, the suture inserter device 1000 comprises a housing 100, an inserter 200, and/or an inserter fork 230. As used herein, the term "inserter" (for e.g., ref. char. 200) and the term "driver" may be used interchangeably. In some embodiments, the housing comprises a housing shaft axially translatable within a housing lumen 110. In some embodiments, the inserter 200 is coupled to the housing shaft 250. In some embodiments, the inserter 200 is axially translatable within the housing lumen 110. In some embodiments, the inserter 200 is axially translatable within the housing lumen 110 via translation of the housing shaft 250. In some embodiments, the inserter 200 is axially translatable within the housing lumen 110 between a distal position and a proximal position. In some embodiments, a distal portion of the inserter 200 is configured to extend from the housing lumen 110. In some embodiments, the inserter 200 comprises an inserter lumen 210 extending at least partially therethrough. In some embodiments, the inserter fork 230 (see FIG. 5C) is disposed within the inserter lumen and configured to extend from the inserter lumen. In some embodiments, the inserter fork 230 is coupled to the housing shaft 250, and is disposed within an inserter lumen. In some embodiments, the insert fork 230 is axially translatable within the inserter lumen 210 and the housing lumen 110. In some embodiments, the inserter fork 230 is axially translatable via the housing shaft 250 and within the inserter lumen 210 inserter 200, wherein the inserter 200 and the inserter lumen 210 are not axially translatable.

In some embodiments, the first end 421 and/or the second end 422 of the suture 420 is coupled to the inserter 200. In some embodiments, an outer surface of the housing shaft 250 comprises a threaded portion 240 configured to engage with a complimentary inner surface of the housing lumen. In some embodiments, the suture inserter device 1000 comprises a handle 300 a proximal end thereof. In some embodiments, the handle 300 comprises a knurl, a knob, a textured surface, or any combination thereof. In some embodiments, the handle 300 is configured to rotate, thereby axially translating the housing shaft 250 and therefore inserter 200. In other embodiments, the handle 300 is configured to rotate, thereby axially translating the housing shaft 250 and therefore the inserter fork 230 within the inserter lumen 210. In some embodiments, the handle 300 and/or the housing 100 rotate relative to the inserter 200. In some embodiments, the housing shaft 250 rotates relative to the handle 300 and the housing 100.

In other embodiments, the handle 300 is configured to rotate and tighten the suture 420 (e.g., tension the suture). In some embodiments, the inserter fork 230 is configured to be retracted and axially translated within the inserter lumen 210 via the housing shaft 250 being pulled back (e.g., manually pulling back the housing shaft 250).

In some embodiments, the housing 100 shaft has a housing 100 threaded portion, wherein the inserter 200 has an inserter 200 threaded portion, and wherein the inserter 200 is axially translatable with respect to the housing lumen 110 by rotating the housing's 100 threaded portion with respect to the inserter's 200 threaded portion.

Figure 5A:
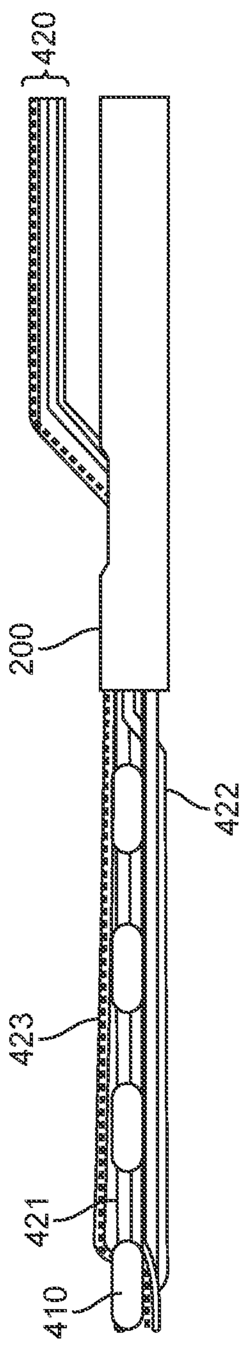
FIG. 5A shows a front view illustration of an exemplary first suturing system, wherein the inserter is in the distal position, per one or more embodiments herein.
Figure 5B:
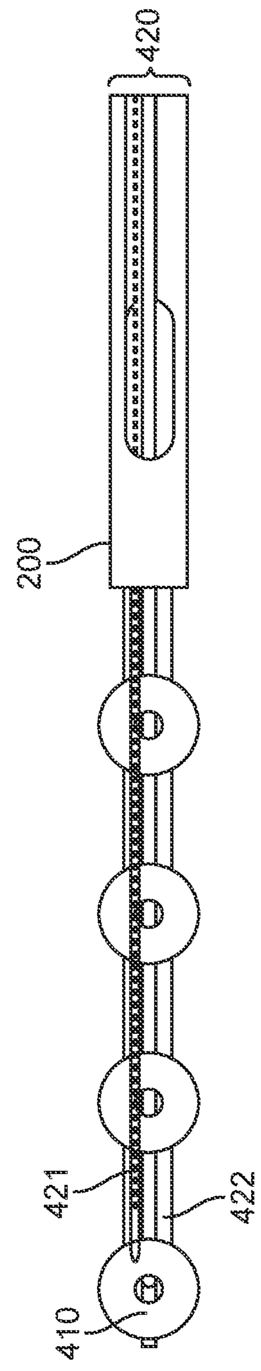
FIG. 5B shows a top view illustration of an exemplary first suturing system, wherein the inserter is in the distal position, per one or more embodiments herein.
Figure 5C:
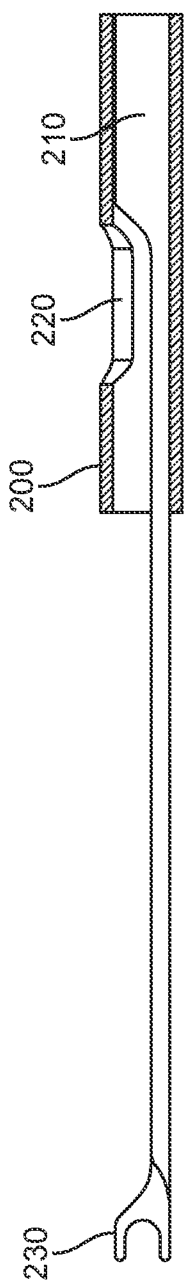
FIG. 5C shows a front cross-sectioned view illustration of the inserter of an exemplary first suturing system per one or more embodiments herein.

In some embodiments, per FIGS. 4A, 4B, and 5C, the inserter 200 comprises a suture channel opening 220 accepting the first end 421 and the second end 422 of the suture 420. In some embodiments, as shown, the first end 421 and the second end 422 of the suture 420 enter and/or exit the inserter lumen 210 via suture channel opening 220, such that a practitioner can apply a tensile force to the first end 421 of the suture 420, the second end 422 of the suture 420, or both. In some embodiments, a distal tip of the inserter 200 comprises an inserter fork 230 receiving an anchor insert 410 (e.g., the distal anchor inserts 410). Accordingly, in some embodiments, the anchor inserts 410 are placed within a bone hole using the inserter fork. Alternatively, in some embodiments, a distal tip of the inserter 200 comprises a channel sized to hold the suture 420 and the anchor inserts 410.

In some embodiments, the suture 420, the anchor 400, the housing 100, the housing shaft 250, the inserter 200, or any combination thereof are formed of metal, plastic, glass, wood, ceramic, or any combination thereof.

With reference to FIGS. 5A-5C, in some embodiments, the first suturing system further comprises a deployment suture 423. In some embodiments, the deployment suture 423 is configured to be linked with a leading anchor insert 410 (for example the anchor insert 410 entering through a bone hole or suture 420 opening first (see e.g., FIG. 4A). In some embodiments, the deployment suture 423 is disposed within the inserter 200, such that when the anchor insert 410 has been inserted through the bone hole or tissue opening, the deployment suture 423 can be pulled so as to transition the anchor 400 from an insertion configuration to the deployed configuration. In some embodiments, continued pulling on the deployment suture 423 separates it from the leading anchor insert 410, and optionally, the deployment suture 423 may then be removed.

First Suturing System—Knotless Version

Figures 19A, 19B:
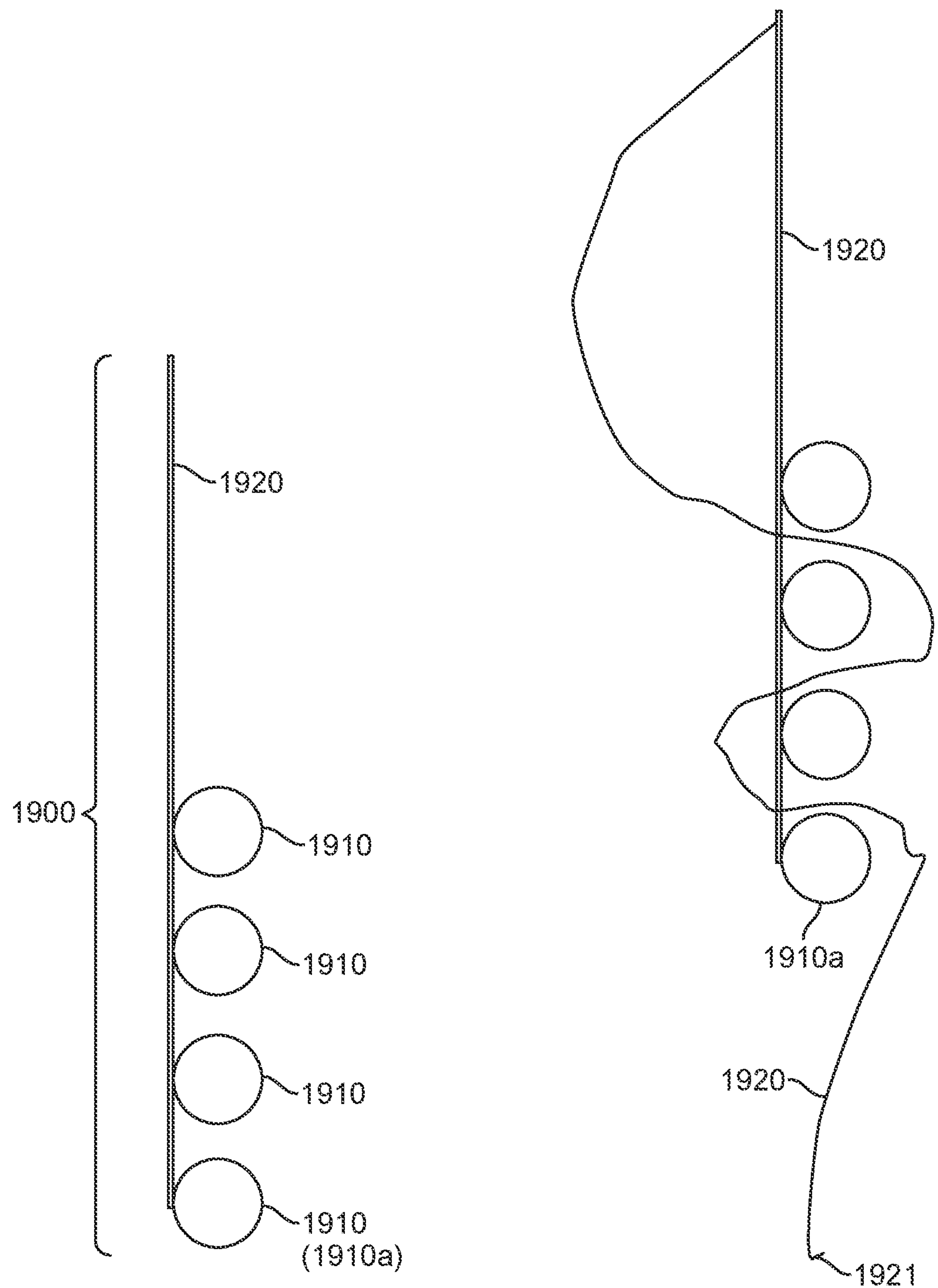
FIG. 19A shows an illustration of a knotless suture anchor in an insertion configuration and comprising a repair suture and a plurality of anchor inserts, per one or more embodiments herein.
FIG. 19B shows an illustration of the knotless suture anchor from FIG. 19A in a deployed configuration, per one or more embodiments herein.

In some embodiments, the first suturing system is provided as a knotless embodiment, such that two ends of a suture need not be knotted together to secure a suture between two bone segments, a bone segment and a tissue segment, and/or two tissue segments. FIGS. 19A-B depict an exemplary configuration of a suture anchor 1900, comprising a repair suture 1920 and one or more anchor inserts 1910. In some embodiments, the anchor inserts 1910 are coupled to the repair suture 1920. In some embodiments, the anchor inserts 1910 are formed of the repair suture 1920 (e.g., the repair suture is knotted along its length to form an anchor insert, wherein a plurality of "knots" (as described herein) correlates to a plurality of anchor inserts). In some embodiments, the anchor inserts 1910 are a separate component from the repair suture 1920, and configured to be attached or otherwise coupled to a first end or about a first end of the repair suture 1920. For example, in some embodiments, the anchor inserts comprise one or more knots formed with a different suture from repair suture 1920 (e.g., an anchor insert suture), wherein the anchor inserts may additionally or alternatively be linked via the anchor suture itself. As used herein, about a first end refers to either located at the first end, or a distance from the first end that is about 0.1% to 50% of the total length of the repair suture 1920. Accordingly, where the anchor inserts are located a distance from the first end of the repair suture, this refers to all the anchor inserts being located between the first end and a second of the repair suture 1920. In some embodiments, the suture anchor 1900 is inserted within a bone hole, similar to as depicted in FIGS. 4A-C.

In some embodiments, a terminal anchor insert (e.g., 1910*a*) is located at a first end of the repair suture 1920 or about a first end of the repair suture 1920 (as described herein). In some embodiments, similar to as depicted in FIGS. 4A-C, as described herein, the anchor 1900 is inserted within the bone hole in an insertion configuration, as seen in FIGS. 19A-B. In some embodiments, the anchor 1900 is inserted within the bone hole similar to as described in FIGS. 4A-5C. In some embodiments, the terminal anchor insert (e.g., 1910*a*) is located closest to the bone hole opening when the anchor 1900 is inserted in the insertion configuration.

In some embodiments, a second end 1921 of the repair suture (e.g., opposite from the first anchor insert 1910*a*) is weaved through anchor inserts 1910 (as depicted in FIG. 19B). Accordingly, in some embodiments, the second end 1921 of the repair suture 1920 is configured to be pulled away from the bone hole, thereby enabling the second end 1921 of the repair suture to be inserted through another bone segment and/or a tissue segment. In some embodiments, where the repair suture 1920 is coupled to the anchor inserts and/or forms one or more of the anchor inserts (e.g., via "knots" along the length of the repair suture), pulling the second end 1921 away from the bone hole transitions the anchor 1900 from an insertion configuration to a deployed configuration, thereby securing a portion of the repair suture 1920 within the bone hole (as described herein, which may be for a first bone segment).

Figure 20A:
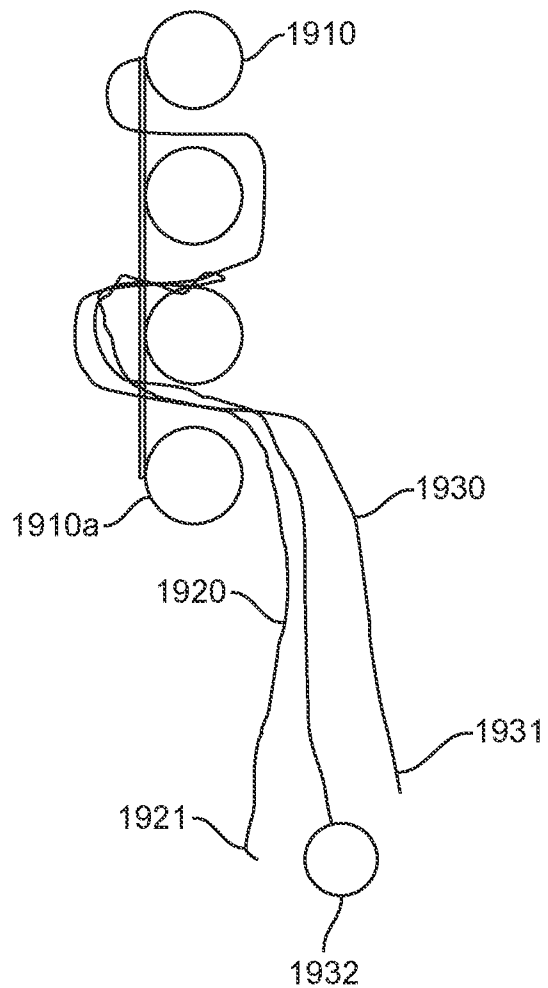
FIG. 20A shows an illustration of a knotless suture anchor in an insertion configuration and comprising a repair suture, a passing suture, and a plurality of anchor inserts, per one or more embodiments herein.
Figure 20B:
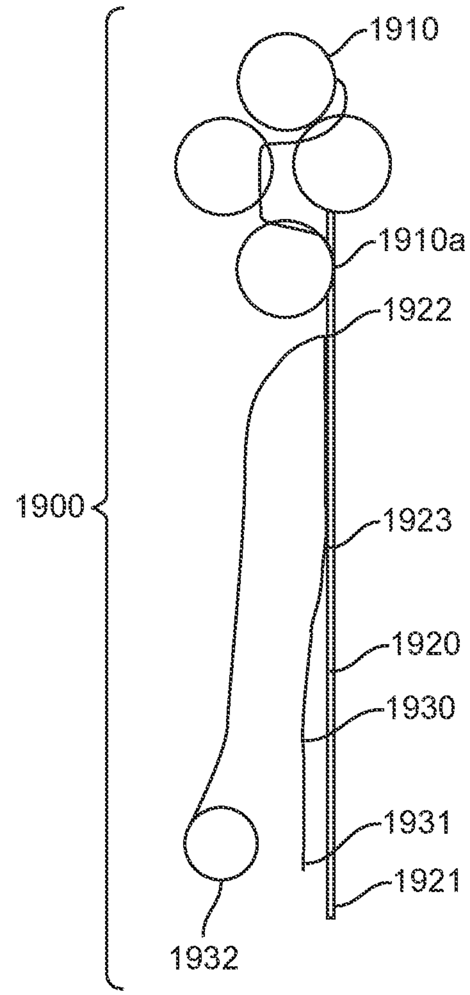
FIG. 20B shows an illustration of the knotless suture anchor from FIG. 20A in a deployed configuration, per one or more embodiments herein.
Figure 21:
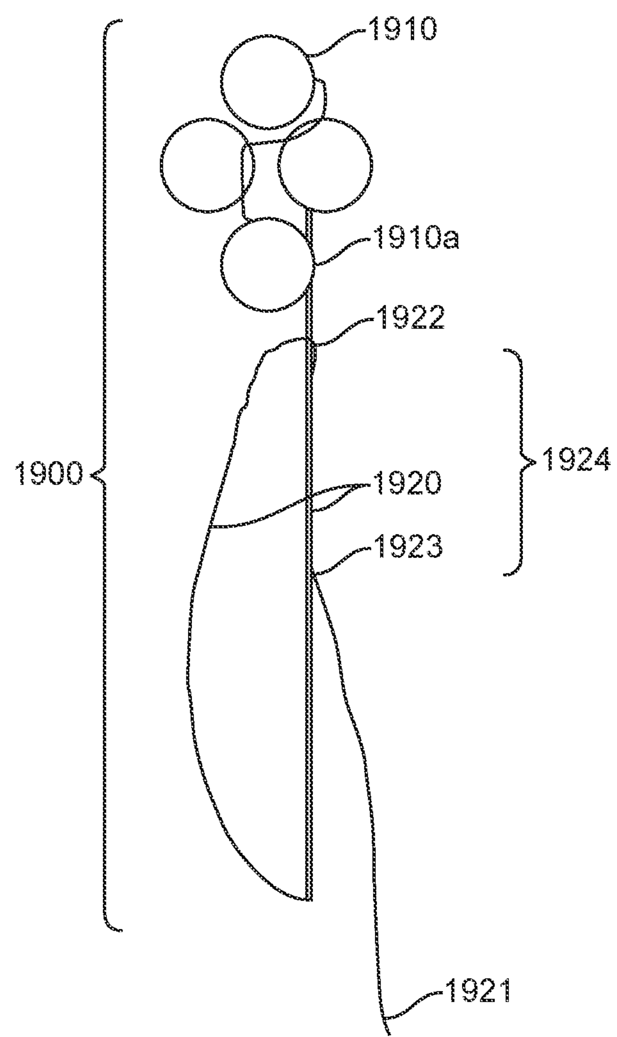
FIG. 21 shows an illustration of the knotless suture anchor from FIG. 20B, wherein the second end of the repair suture has been pull through and out of the hollow interior of the repair suture, such that a portion of the repair suture is secured within the hollow interior.

In some embodiments, the repair suture 1920 is inserted into a bone hole with a passing suture. For example, FIGS. 20A-B depict an anchor comprising a repair suture 1920, as described herein, with a passing suture 1930. In some embodiments, the repair suture 1920 comprises a hollow interior at least along a portion therein, wherein the passing suture 1930 is configured to be inserted through a portion of the hollow interior of the repair suture 1920. In some embodiments, the repair suture 1920 comprises two openings 1922, 1923 along its length, such that the passing suture 1930 is inserted through one opening (e.g., 1922) and comes out another opening (e.g., 1923). In some embodiments, the distance between the two openings 1922, 1923 is from about 0.2 mm to about 45 mm, from about 0.5 mm to about 30 mm, from about 0.7 mm to about 25 mm, from about 1.0 mm to about 20 mm, from about 1.5 mm to about 15 mm, or from about 2 mm to about 10 mm. In some embodiments, the repair suture 1920 comprises a #2 suture. In some embodiments, the passing suture 1930 comprises a #2-0 suture. In some embodiments, the passing suture 1930 comprises a suture loop 1932 at a primary end of the passing suture 1930, which is opposite a secondary end 1931 of the passing suture 1930. In some embodiments, as described herein, the passing loop is at least partially located within the hollow interior, wherein the primary end 1932 extends from a first opening (e.g., 1922), while the secondary end 1931 extends from the second opening (e.g., 1923). In some embodiments, the passing loop 1932 is configured to receive and couple with the second end 1921 of the repair suture 1920, such that pulling on the secondary end 1931 of the passing suture 1930 also pulls the second end 1921 of the repair suture 1920 (e.g., via its coupling with the passing loop 1932), and thereby allows the second end 1921 of the repair suture 1920 to be pulled through a first opening (e.g., 1922) of said repair suture 1920 to the hollow interior (as described herein), through the hollow interior of the repair suture 1920, and then out a second opening (e.g., 1923), such that a portion of the repair suture 1920 is inserted within itself within the hollow interior. FIG. 21 depicts an exemplary anchor (in the deployed configuration) wherein the second end 1921 of the repair suture passed through the hollow interior of the repair suture 1920 (between the two openings 1922, 1923), such that a portion of the repair suture 1920 remains within the hollow interior portion 1924. In some embodiments, the portion of the repair suture within the hollow interior portion 1924 is held in place due to the friction therein (e.g., outer wall of portion of repair suture contacting inner wall of hollow interior of the repair suture), that helps prevent the portion of the repair suture from sliding out of the hollow interior portion 1924 (e.g., helps prevent the second end 1921 of the repair suture moving back towards the opening 1923). In some embodiments, such configuration of securing the repair suture within itself (in the hollow interior) allows the repair suture 1920 to secure a bone segment (via the anchor inserts 1910 in the bone hole) with a tissue and/or other bone segments (via the repair suture being inserted through said tissue and/or other bone segments, and back to the bone hole and through the hollow interior).

Second Suturing System

Another aspect provided herein, per FIGS. 6A-8 and 17A-17B, is a second suturing system. In some embodiments, the second suturing system is configured for operating on a knee, shoulder, a hip, a foot, an ankle, an elbow, a hand, a wrist, or any combination thereof. In some embodiments, the second suturing system is configured for meniscal repair, extra-capsular repair: medial collateral ligament (MCL), lateral collateral ligament (LCL) and posterior oblique ligament; Iliotibial band tenodesis (IBT); patellar tendon repair; vastus medialis obliquus advancement (VMO); joint capsule closure, or any combination thereof of the knee. In some embodiments, the second suturing system is configured for rotator cuff repair, bankart repair, slap lesion repair, biceps tenodesis, acromio-clavicular separation repair, deltoid repair, capsular shift, capsulolabral reconstruction, or any combination thereof of the shoulder. In some embodiments, the second suturing system is configured for lateral stabilization, medial stabilization, achilles tendon repair, hallux valgus reconstruction, mid-foot reconstruction, metatarsal ligament repair/tendon repair, bunionectomy, or any combination thereof of the foot. In some embodiments, the second suturing system is configured for lateral stabilization, medial stabilization, achilles tendon repair, hallux valgus reconstruction, mid-foot reconstruction, metatarsal ligament repair/tendon repair, bunionectomy, or any combination thereof of the ankle. In some embodiments, the second suturing system is configured for scapholunate ligament reconstruction, ulnar collateral ligament reconstruction, radial collateral ligament reconstruction, or any combination thereof of the hand. In some embodiments, the second suturing system is configured for scapholunate ligament reconstruction, ulnar collateral ligament reconstruction, radial collateral ligament reconstruction, or any combination thereof of the wrist. In some embodiments, the second suturing system is configured for biceps tendon reattachment, tennis elbow repair, ulnar or radial collateral ligament reconstruction, lateral epicondylitis repair, or any combination thereof of the elbow.

Figure 17A:
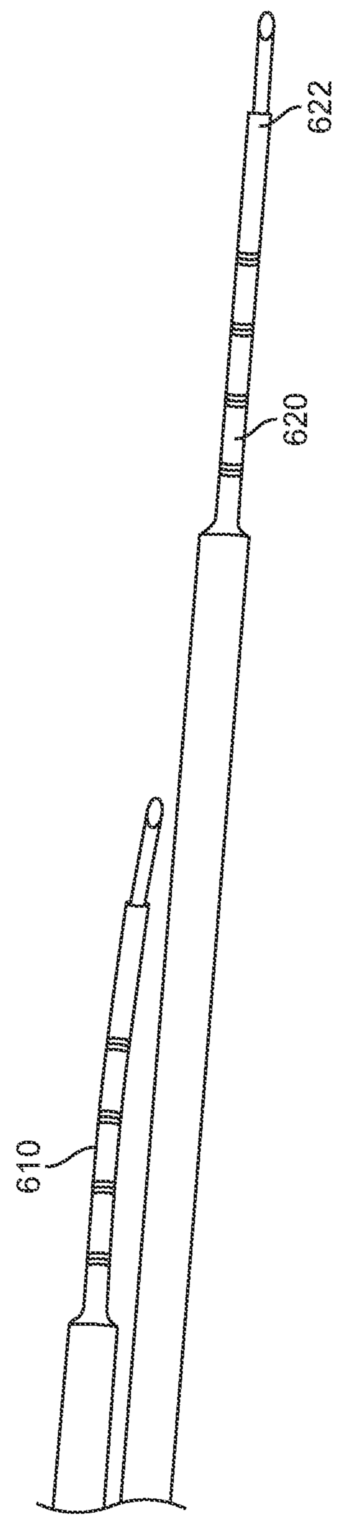
FIG. 17A shows a front-top perspective view illustration of an exemplary second suturing system without the suture, per one or more embodiments herein.
Figure 17B:
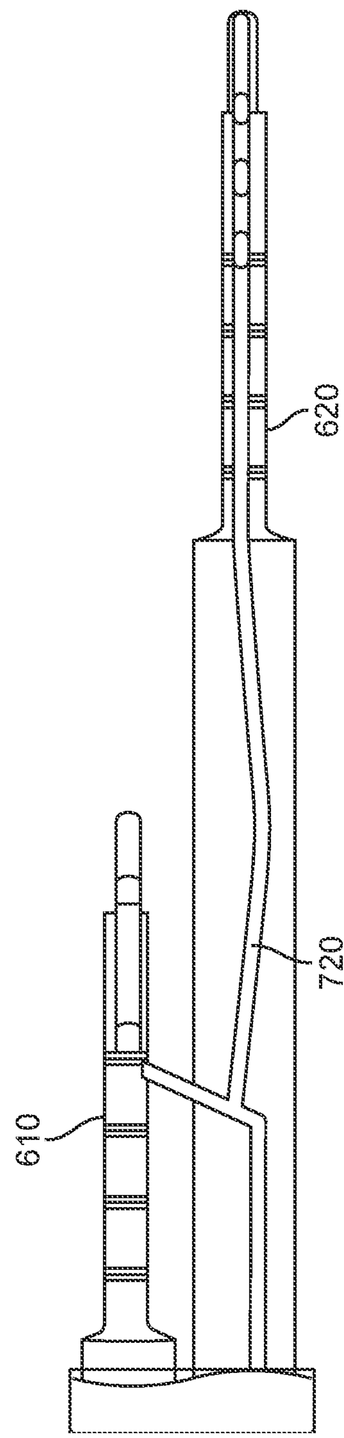
FIG. 17B shows a top view illustration of an exemplary second suturing system the suture, per one or more embodiments herein.

In some embodiments, the second suturing system comprises an anchor 700 and a suture inserter device 2000. In some embodiments, the anchor 700 comprises a suture 720, a first anchor 700A, and a second anchor 700B. In some embodiments, the first anchor 700A is coupled to a distal portion of the suture 720 and the second anchor 700B is coupled to the suture 720 proximal to the first anchor 700A. In some embodiments, the suture inserter device 2000 comprises a housing 500 and a second needle 620 and a second housing lumen 520. In some embodiments, the housing 500 comprises a first needle 610. In some embodiments, the first anchor 700A couples to the second needle 620. In some embodiments, the first needle 610 receives a portion of the suture 720 proximal to the first anchor 700A and distal to the second anchor 700B. In some embodiments, the second needle 620 is axially translatable within the second housing lumen 520 between a primary configuration and a secondary configuration. With reference to FIG. 7C, in some embodiments the second housing lumen is disposed within the housing 500. As shown in FIG. 17A, in some embodiments a needle described herein comprises a distal end with a step 622, wherein the anchor inserts are placed at the distal end.

Figure 8:
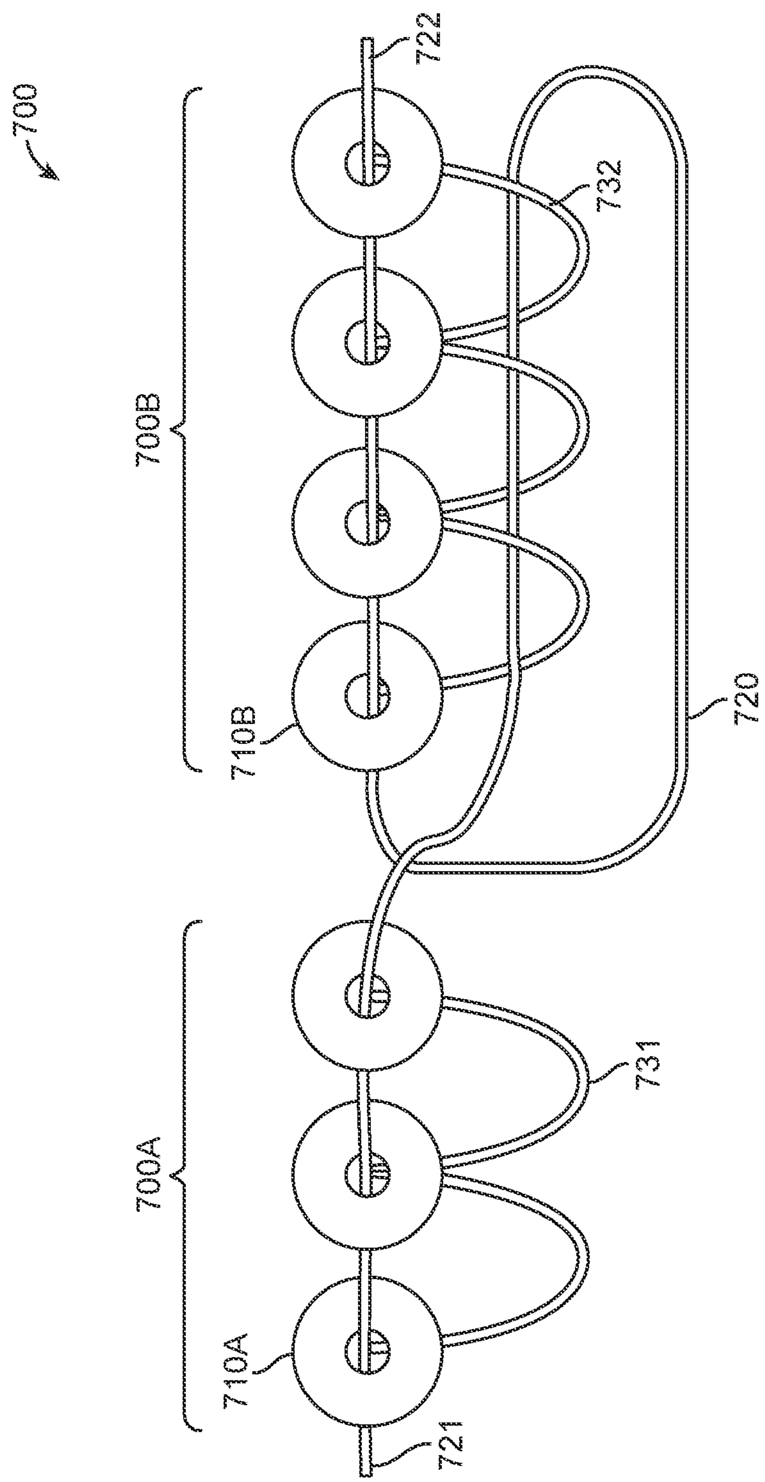
FIG. 8 shows an illustration of an exemplary anchor of the second and third suturing systems, per one or more embodiments herein.

In some embodiments, per FIG. 8, the first anchor 700A comprises a plurality of first anchor inserts 710A, and the second anchor 700B comprises a plurality of second anchor inserts 710B. In some embodiments, each of the plurality of first anchor inserts 710A is coupled to a preceding first anchor insert 710A, a subsequent first anchor insert 710A, or both. In some embodiments, each of the plurality of first anchor inserts 710A is coupled to a preceding first anchor insert 710A, a subsequent first anchor insert 710A, or both by a first link 731. In some embodiments, each of the plurality of second anchor inserts 710B is coupled to a preceding second anchor insert 710B, a subsequent second anchor insert 710B, or both. In some embodiments, each of the plurality of second anchor inserts 710B is coupled to a preceding second anchor insert 710B, a subsequent second anchor insert 710B, or both by a second link 732. In some embodiments, the first link 731, the second link 732, or both are formed of the same materials as the suture 720. In some embodiments, one or more of the first anchor inserts 710A, one or more of the second anchor inserts 710B, or both have a cavity therein. In some embodiments, the first link 731, the suture 720, or both pass through the cavity of one or more of the plurality of first anchor inserts 710A. In some embodiments, the first link 731, the suture 720, or both freely pass through the cavity of one or more of the plurality of first anchor inserts 710A. In some embodiments, the second link 732, the suture 720, or both pass through the cavity of one or more of the plurality of second anchor inserts 710B. In some embodiments, the second link 732, the suture 720, or both freely pass through the cavity of one or more of the plurality of second anchor inserts 710B. Further, as shown, in some embodiments, at least a portion of the suture 720 passes through a loop formed by the first link 731, the second link 732, or both. In some embodiments, at least two of the plurality of first anchor inserts 710A are coupled, wherein at least two of the plurality of first anchor inserts 710A inserts are coupled, or both. In some embodiments, at least two of the plurality of first anchor inserts 710A inserts are separate, wherein at least two of the plurality of first anchor inserts 710A are decoupled, or both. In some embodiments, per FIG. 6C, the plurality of first anchor inserts 710A couple to the second needle 620, wherein the plurality of second anchor inserts 710B couple to the first needle 610. Alternatively, in some embodiments, the plurality of first anchor inserts 710A couple to the first needle 610, wherein the plurality of second anchor inserts 710B couple to the second needle 620.

In some embodiments, at least a portion of the plurality of first anchor inserts 710A, plurality of second anchor inserts 710B, or both, have a shape comprising a sphere, a cylinder, a pyramid, a torus, a cone, a prism, or any combination thereof. For example, per FIG. 7C the suture 720 may run through the first anchor inserts 710A and/or the second anchor inserts 710B twice to create a suture one way lock. In some embodiments, at least a portion (e.g., a first anchor insert per FIG. 7C) of the plurality of first anchor inserts 710A and/or the plurality of second anchor inserts 710B may attach to the end of the suture while the remaining portions of the first anchor inserts 710A or second anchor inserts 710B moving freely. In some embodiments, at least a portion of the plurality of first anchor inserts 710A, plurality of second anchor inserts 710B, or both, comprise 3, 4, 5, 6, 7, 8 or more anchor inserts 710A 710B. In some embodiments, the anchor inserts comprise one or more knots formed with a suture separate from the suture 720 (e.g., anchor suture, as described herein), wherein the link between the anchor inserts is the anchor suture itself.

Figure 6A:
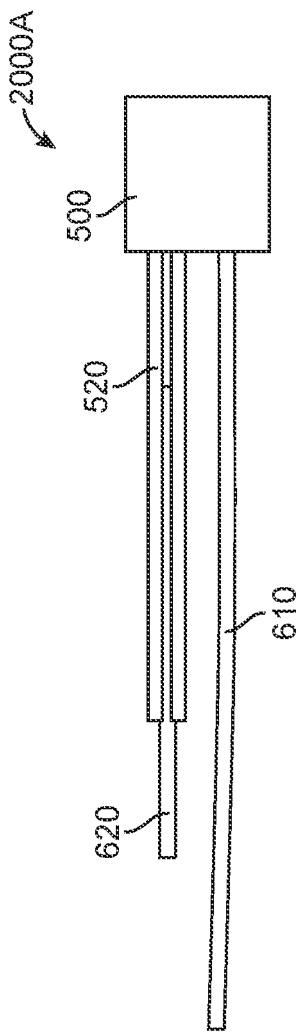
FIG. 6A shows a top view illustration of an exemplary second suturing system, wherein the second needle is in a primary configuration, per one or more embodiments herein.
Figure 6B:
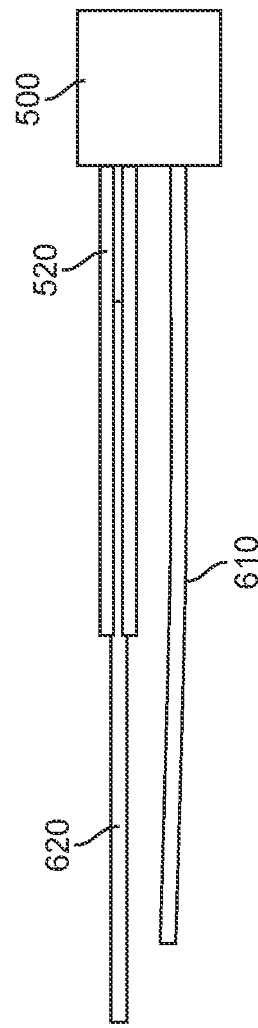
FIG. 6B shows a top view illustration of an exemplary second suturing system, wherein the second needle is in a secondary configuration, per one or more embodiments herein.
Figure 6C:
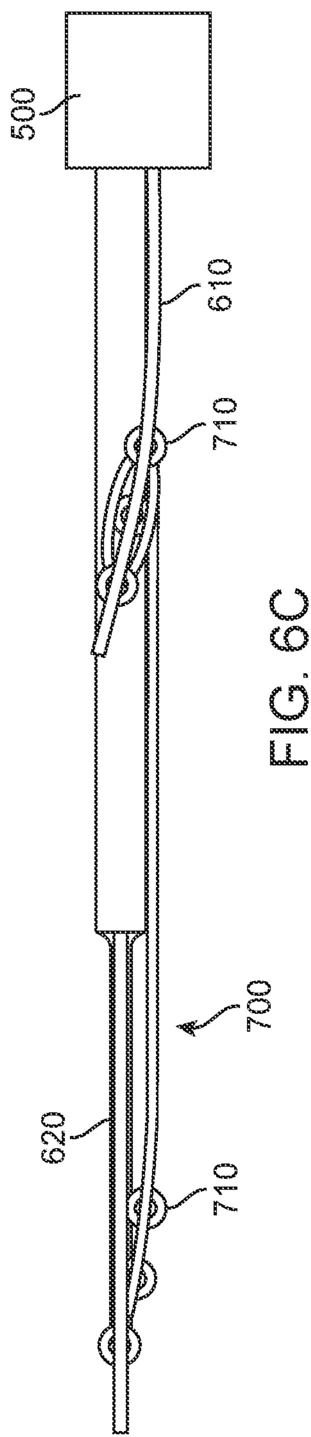
FIG. 6C shows a front view illustration of an exemplary second suturing system, per one or more embodiments herein.
Figure 7A:
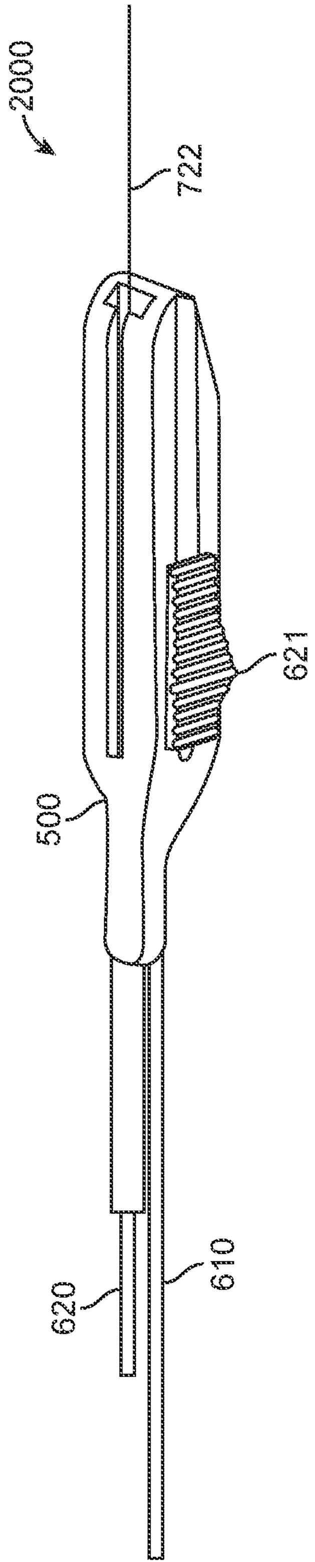
FIG. 7A shows a front-top perspective view illustration of an exemplary second suturing system, wherein the second needle is in the primary configuration, per one or more embodiments herein.
Figure 7B:
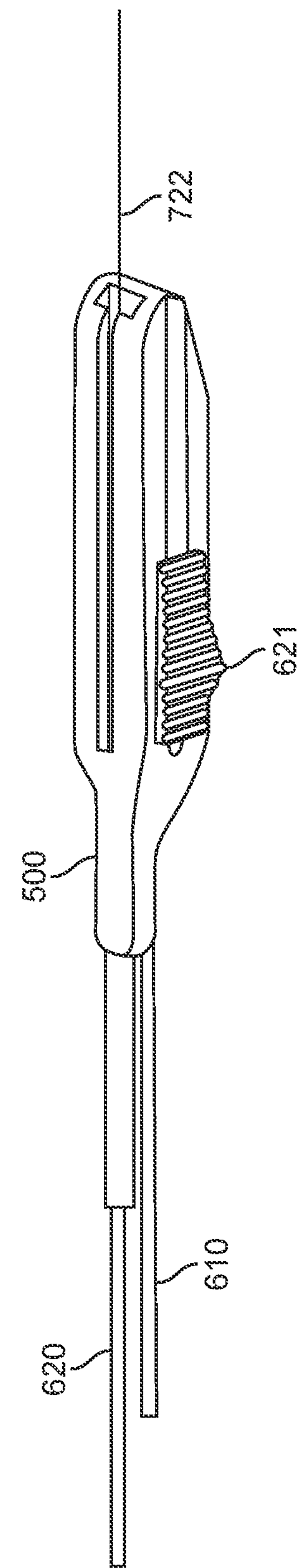
FIG. 7B shows a front-top perspective view illustration of an exemplary second suturing system, wherein the second needle is in the secondary configuration, per one or more embodiments herein.
Figure 7C:
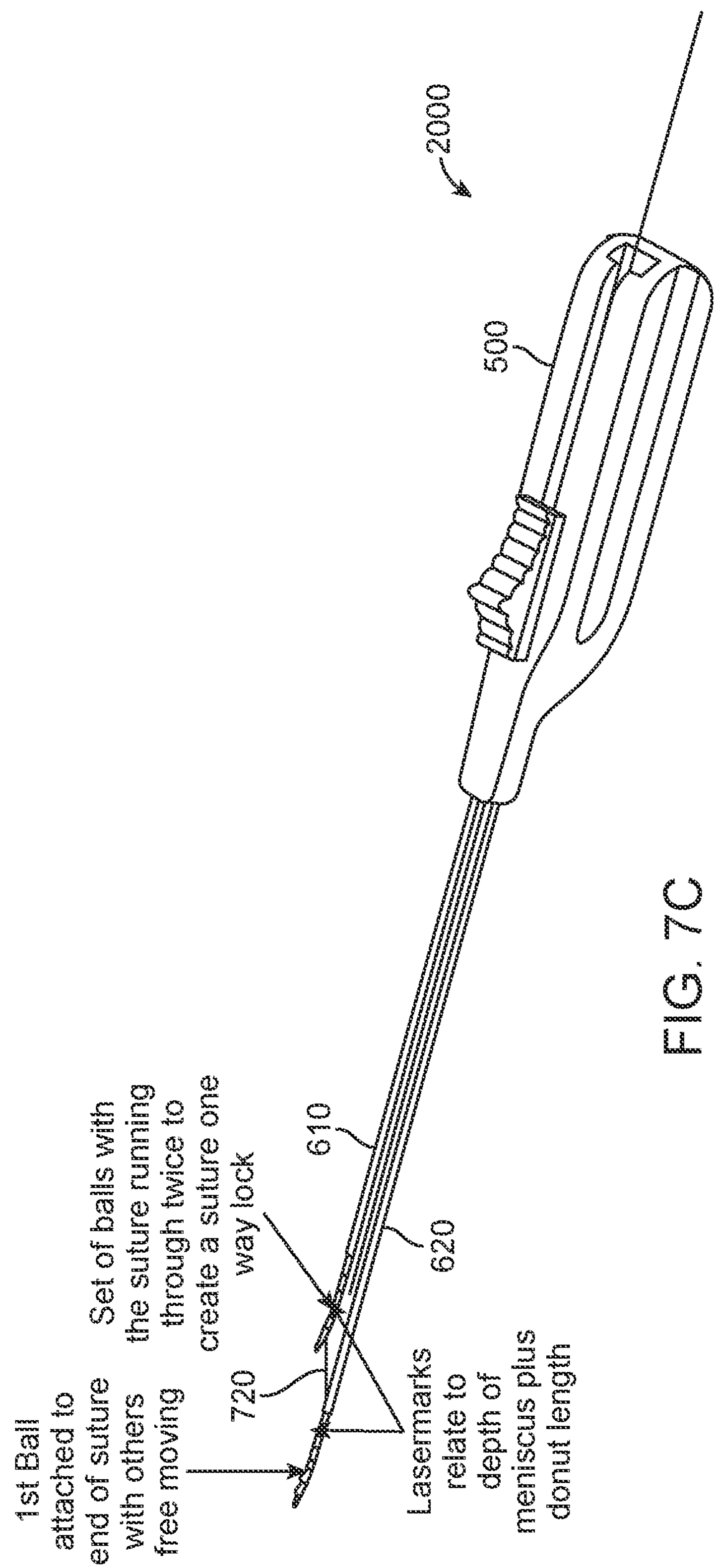
FIG. 7C a front-top perspective view illustration of an exemplary second suturing system, per one or more embodiments herein.

In some embodiments, the second needle 620 is axially translatable within the second housing lumen 520 between a primary configuration, per FIGS. 6A and 7A, and a secondary configuration, per FIGS. 6B and 7B. In some embodiments, in the primary configuration, a distal point of the second needle 620 is proximal to a distal point of the first needle 610. In some embodiments, in the primary configuration, a distal point of the second needle 620 is distal to a distal point of the first needle 610. In some embodiments, a distal point of the second needle 620 is closer to a distal point of the housing 500 in the primary configuration than in the secondary configuration.

In some embodiments, the housing 500, the second needle 620 or both, comprise an indicator of the distance between the distal point of the housing 500 and the distal point of the second needle 620. In some embodiments, per FIG. 7C, the first needle 610, the second needle 620 or both, comprise an indicator (e.g., a laser mark) for indicating the depth of relating to depth of soft tissue in applications (e.g., meniscus plus anchor insert length). In some embodiments, per FIGS. 7A and 7B, the suture inserter device 2000 further comprises a second needle slider 621 coupled to the second needle 620. In some embodiments, the second needle slider 621 translates the second needle 620 within the second housing lumen 520 between the primary configuration and the secondary configuration. In some embodiments, the first anchor insert 710A, the second anchor insert 710B, or both, have a diameter of less than about 5 mm.

Third Suturing System

Another aspect provided herein, per FIGS. 9A-10B, is a third suturing system. In some embodiments, the third suturing system is configured for operating on a shoulder, a hip, a foot, an ankle, an elbow, or any combination thereof. In some embodiments, the third suturing system is configured for rotator cuff repair, bankart repair, slap lesion repair, biceps tenodesis, acromio-clavicular separation repair, deltoid repair, capsular shift, capsulolabral reconstruction, or any combination thereof of the shoulder. In some embodiments, the third suturing system is configured for meniscal repair, extra-capsular repair: medial collateral ligament (MCL), lateral collateral ligament (LCL) and posterior oblique ligament; Iliotibial band tenodesis (IBT); patellar tendon repair; vastus medialis obliquus advancement (VMO); joint capsule closure, or any combination thereof of the knee. In some embodiments, the second suturing system is configured for rotator cuff repair, bankart repair, slap lesion repair, biceps tenodesis, acromio-clavicular separation repair, deltoid repair, capsular shift, capsulolabral reconstruction, or any combination thereof of the shoulder. In some embodiments, the third suturing system is configured for lateral stabilization, medial stabilization, achilles tendon repair, hallux valgus reconstruction, mid-foot reconstruction, metatarsal ligament repair/tendon repair, bunionectomy, or any combination thereof of the foot. In some embodiments, the third suturing system is configured for lateral stabilization, medial stabilization, achilles tendon repair, hallux valgus reconstruction, mid-foot reconstruction, metatarsal ligament repair/tendon repair, bunionectomy, or any combination thereof of the ankle. In some embodiments, the third suturing system is configured for scapholunate ligament reconstruction, ulnar collateral ligament reconstruction, radial collateral ligament reconstruction, or any combination thereof of the hand. In some embodiments, the third suturing system is configured for scapholunate ligament reconstruction, ulnar collateral ligament reconstruction, radial collateral ligament reconstruction, or any combination thereof of the wrist. In some embodiments, the third suturing system is configured for biceps tendon reattachment, tennis elbow repair, ulnar or radial collateral ligament reconstruction, lateral epicondylitis repair, or any combination thereof of the elbow.

In some embodiments, the third suturing system comprises an anchor 700 and a suture inserter device 3000. In some embodiments, the anchor 700 comprises a suture 720, a first anchor 700A, and a second anchor 700B. In some embodiments, the first anchor 700A is coupled to a distal portion of the suture 720 and the second anchor 700B is coupled to the suture 720 proximal to the first anchor 700A. In some embodiments, the suture inserter device 3000 comprises a housing 500, a first needle 610, and a second needle 620. In some embodiments, the housing 500 comprises a first housing lumen 510 and a second housing lumen 520. In some embodiments, the first anchor 700A couples to the second needle 620. In some embodiments, the first needle 610 receives a portion of the suture 720 proximal to the first anchor 700A and distal to the second anchor 700B. In some embodiments, the first needle 610 is axially translatable within the first housing lumen 510 between a first primary configuration and a first secondary configuration. In some embodiments, the second needle 620 is axially translatable within the second housing lumen 520 between a second primary configuration and a second secondary configuration. With reference to FIG. 10C, depicting other embodiments of the third suture systems from FIGS. 10A-B, wherein in some embodiments, the first housing lumen and the second housing lumen are disposed within the housing 500. In some embodiments, for any suture inserter device described herein (e.g., 2000 or 3000), the suture system may further comprise a gripping feature 502. As shown in FIG. 17A, in some embodiments a needle described herein comprises a distal end with a step 622, wherein the anchor inserts are placed at the distal end. In some embodiments, for a suture system described herein, one needle (e.g., 610) is curved or angled relative to another needle (e.g., 620).

In some embodiments, per FIG. 8, the first anchor 700A comprises a plurality of first anchor 710A inserts, and the second anchor 700B comprises a plurality of second anchor inserts 710B. In some embodiments, each of the plurality of first anchor inserts 710A is coupled to a preceding first anchor insert 710A, a subsequent first anchor insert 710A, or both. In some embodiments, each of the plurality of first anchor inserts 710A is coupled to a preceding first anchor insert 710A, a subsequent first anchor insert 710A, or both by a first link 731. In some embodiments, each of the plurality of second anchor inserts 710B is coupled to a preceding second anchor insert 710B, a subsequent second anchor insert 710B, or both. In some embodiments, each of the plurality of second anchor inserts 710B is coupled to a preceding second anchor insert 710B, a subsequent second anchor insert 710B, or both by a second link 732. In some embodiments, the first link 731, the second link 732, or both are formed of the same materials as the suture 720. In some embodiments, one or more of the first anchor inserts 710A, one or more of the second anchor inserts 710B, or both have a cavity therein. In some embodiments, the first link 731, the suture 720, or both to pass through the cavity of one or more of the plurality of first anchor inserts 710A. In some embodiments, the first link 731, the suture 720, or both freely pass through the cavity of one or more of the plurality of first anchor inserts 710A. In some embodiments, the second link 732, the suture 720, or both to pass through the cavity of one or more of the plurality of second anchor inserts 710B. In some embodiments, the second link 732, the suture 720, or both to freely pass through the cavity of one or more of the plurality of second anchor inserts 710B. Further, as shown, in some embodiments, at least a portion of the suture 720 passes through a loop formed by the first link 731, the second link 732, or both. In some embodiments, at least two of the plurality of first anchor inserts 710A are coupled, wherein at least two of the plurality of first anchor inserts 710A are coupled, or both. In some embodiments, at least two of the plurality of first anchor inserts 710A are separate, wherein at least two of the plurality of first anchor inserts

710A are decoupled, or both. In some embodiments, the first anchor 700A is coupled to a first end of the suture 720 (e.g., see reference character 721), while a second end of the suture 720 (e.g., see reference character 722) extends from the second anchor 700B. In some embodiments, as described herein, tensioning a second or third suture inserter device described herein (e.g., 2000 or 3000) comprises pulling on the second end 722 of the suture 720.

Figure 9A:
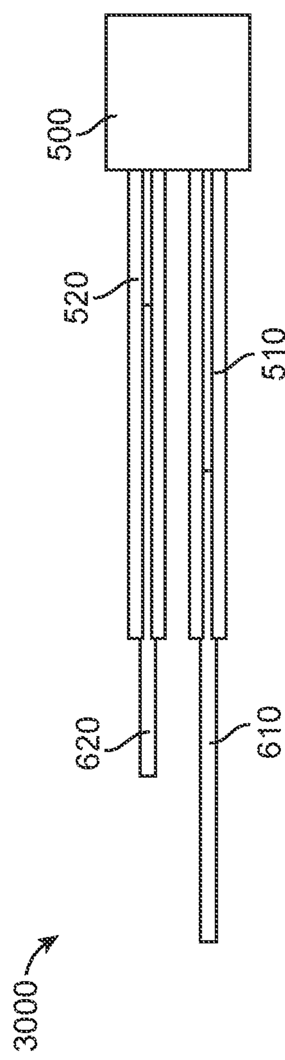
FIG. 9A shows a top view illustration of an exemplary third suturing system, wherein the first needle is in a first primary configuration, and wherein the second needle is in a second primary configuration, per one or more embodiments herein.
Figure 9B:
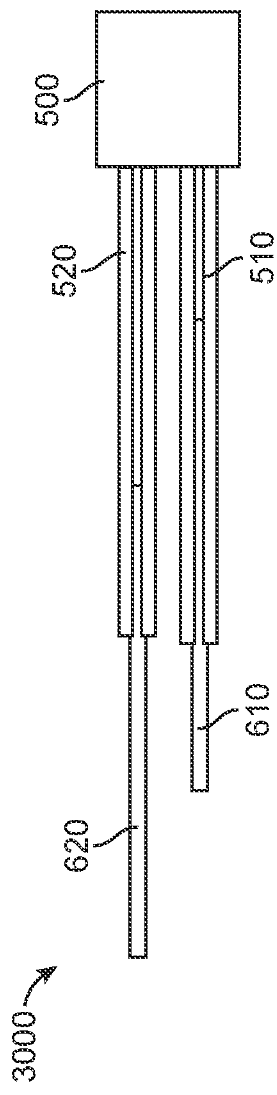
FIG. 9B shows a top view illustration of an exemplary third suturing system, wherein the first needle is in a first secondary configuration, and wherein the second needle is in a second secondary configuration, per one or more embodiments herein.
Figure 9C:
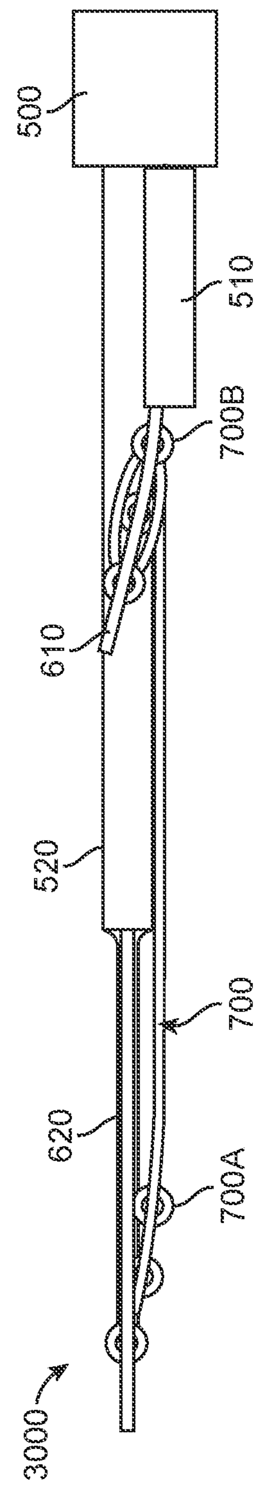
FIG. 9C shows a top view illustration of an exemplary third suturing system, per one or more embodiments herein.

In some embodiments, per FIG. 9C, the plurality of first anchor inserts 710A couple to the second needle 620, wherein the plurality of second anchor inserts 710B couple to the first needle 610. Alternatively, in some embodiments, the plurality of first anchor inserts 710A couple to the first needle 610, wherein the plurality of second anchor inserts 710B couple to the second needle 620.

In some embodiments, at least a portion of the plurality of first anchor inserts 710A, plurality of second anchor inserts 710B, or both, have a shape comprising a sphere, a cylinder, a pyramid, a torus, a cone, a prism, or any combination thereof. In some embodiments, at least a portion of the plurality of first anchor inserts 710A, plurality of second anchor inserts 710B, or both, comprise 3, 4, 5, 6, 7, 8 or more anchor inserts 710A 710B. In some embodiments, the anchor inserts comprise one or more knots formed with a suture separate from the suture 720 (e.g., anchor suture, as described herein), wherein the link between the anchor inserts is the anchor suture itself.

Figure 10A:
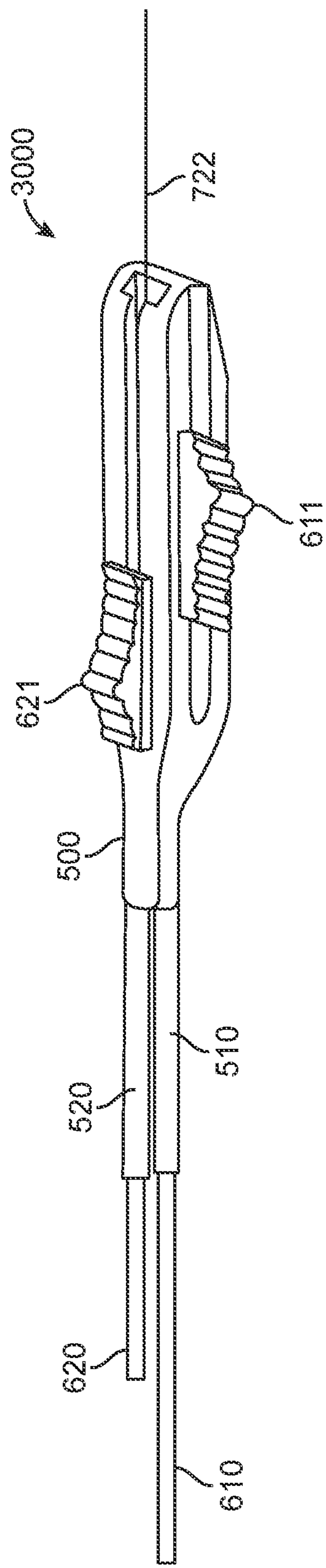
FIG. 10A shows a front-top perspective view illustration of an exemplary third suturing system, wherein the first needle is in a first primary configuration, and wherein the second needle is in a second primary configuration, per one or more embodiments herein.
Figure 10B:
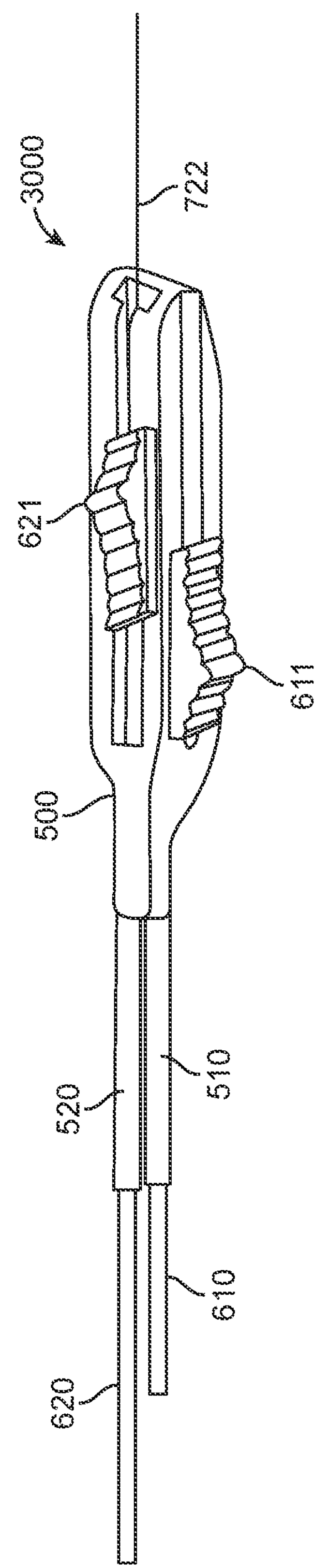
FIG. 10B shows a front-top perspective view illustration of an exemplary third suturing system, wherein the first needle is in a first secondary configuration, and wherein the second needle is in a second secondary configuration, per one or more embodiments herein.
Figure 10C:
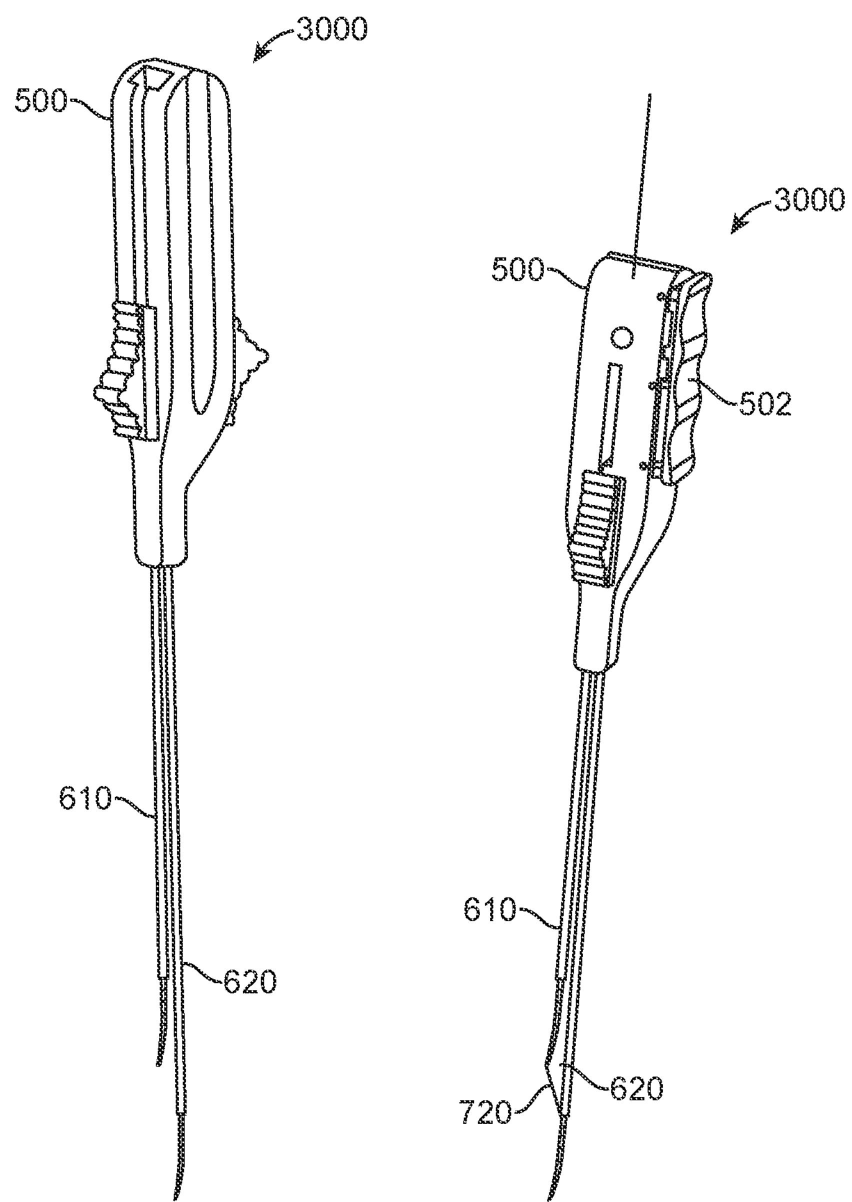
FIG. 10C shows a front-top perspective view illustration of an exemplary third suturing system, per one or more embodiments herein.
Figure 11A:
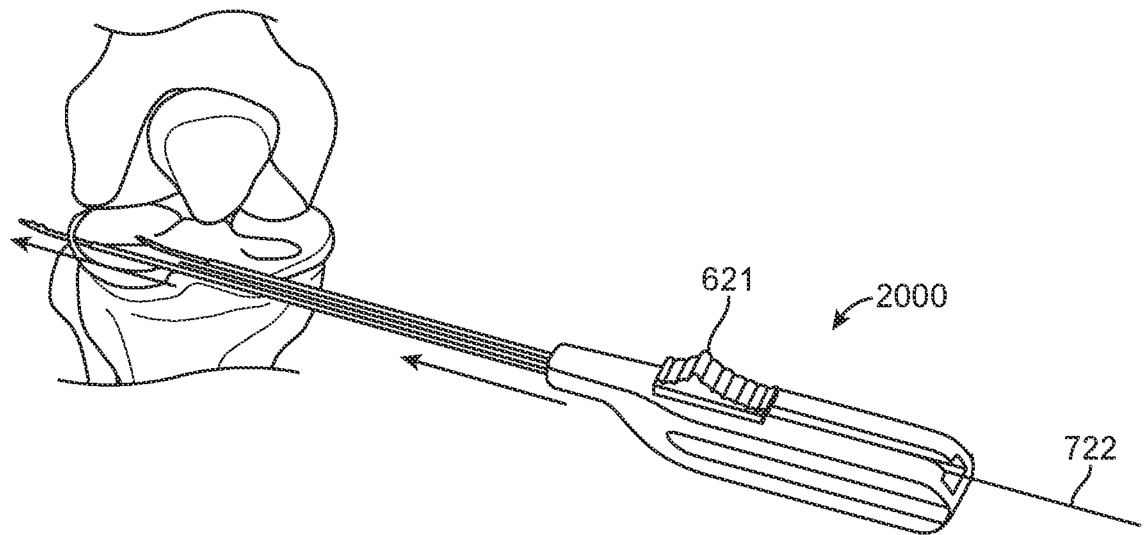
FIG. 11A shows a perspective view of a first step in a second method of anchoring two portions of a soft tissue together, per one or more embodiments herein.
Figure 11B:
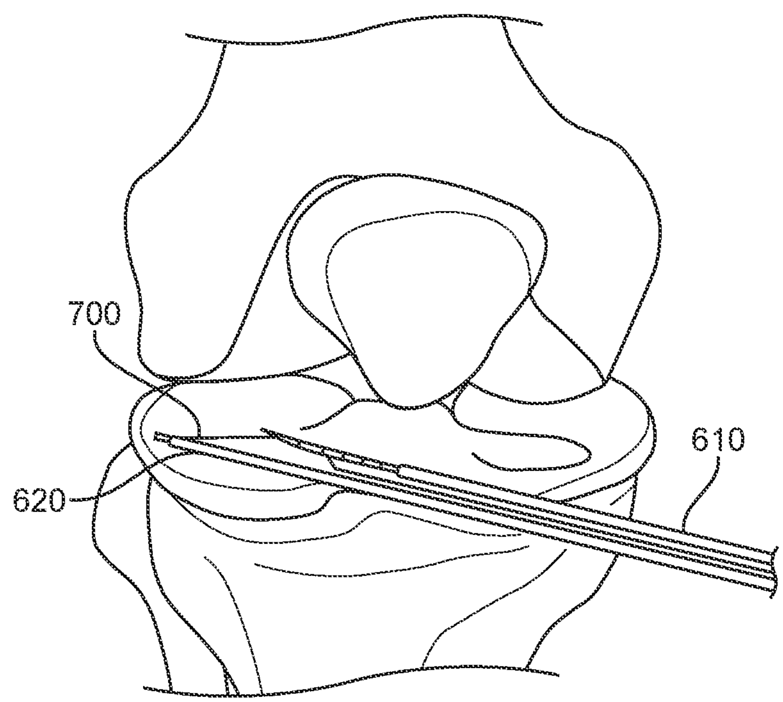
FIG. 11B shows a detailed perspective view of a first step in the second method of anchoring two portions of a soft tissue together, per one or more embodiments herein.
Figure 12A:
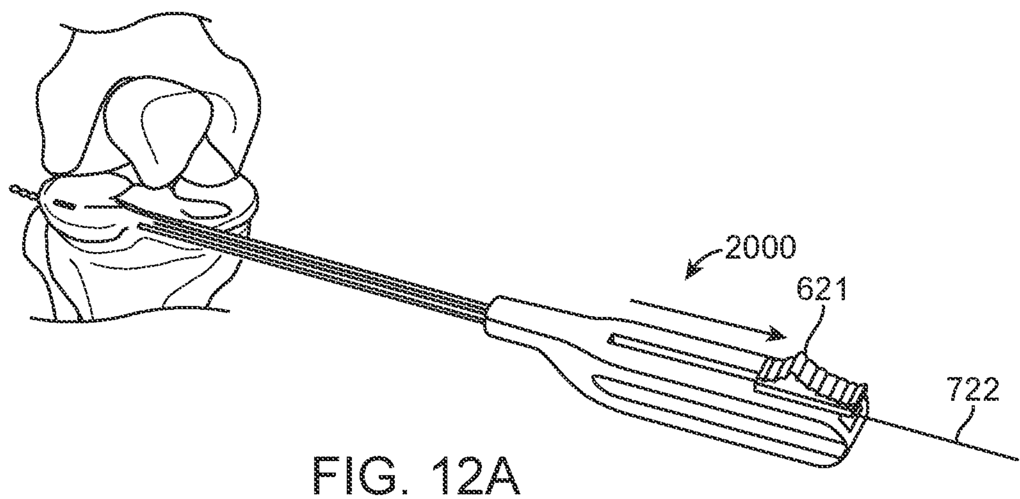
FIG. 12A shows a perspective view of a second step in the second method of anchoring two portions of a soft tissue together, per one or more embodiments herein.
Figure 12B:
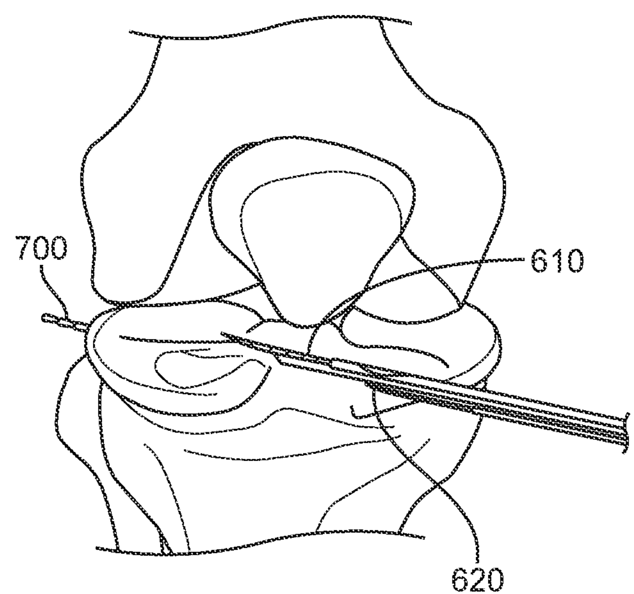
FIG. 12B shows a detailed perspective view of a second step in the second method of two portions of a soft tissue together, per one or more embodiments herein.
Figure 13A:
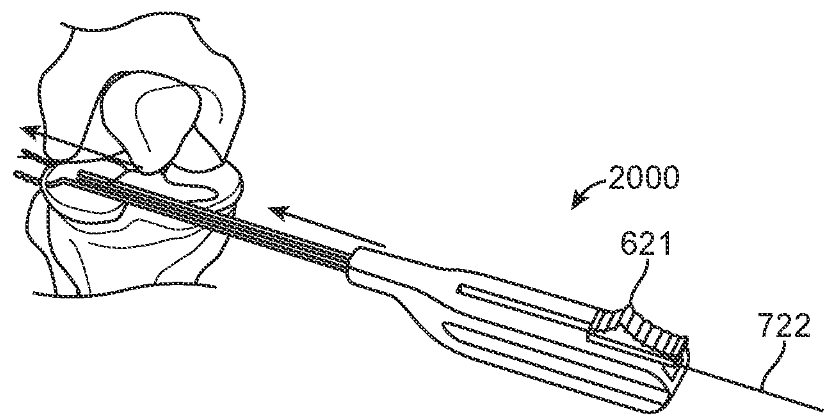
FIG. 13A shows a perspective view of a third step in the second method of anchoring two portions of a soft tissue together, per one or more embodiments herein.
Figure 13B:
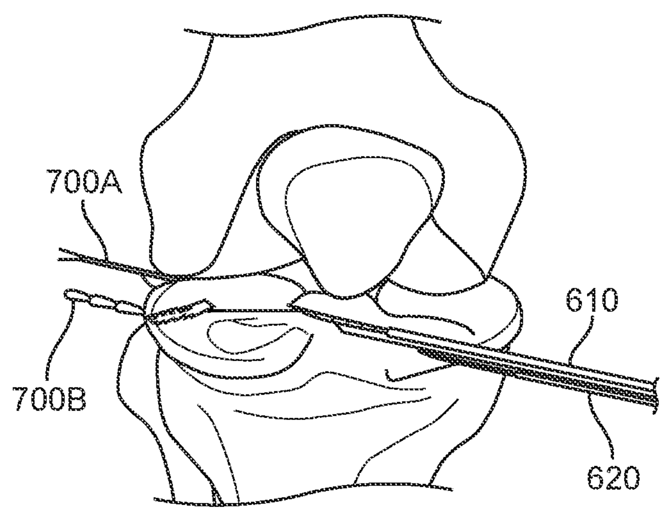
FIG. 13B shows a detailed perspective view of a third step in the second method of anchoring two portions of a soft tissue together, per one or more embodiments herein.
Figure 14A:
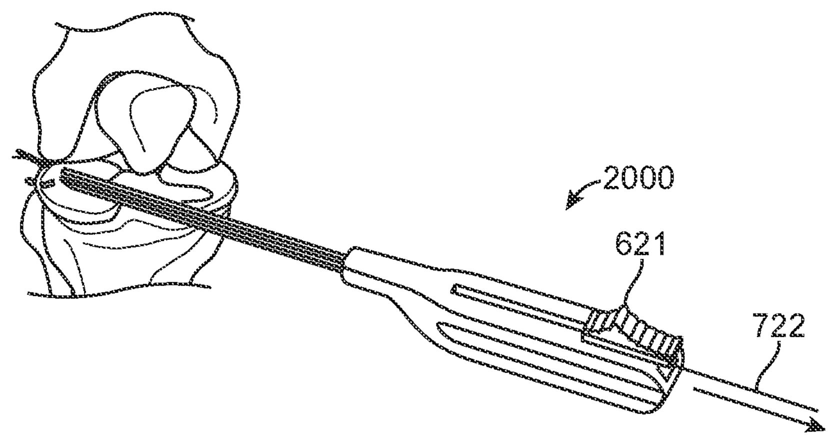
FIG. 14A shows a perspective view of a fourth step in the second method of anchoring two portions of a soft tissue together, per one or more embodiments herein.
Figure 14B:
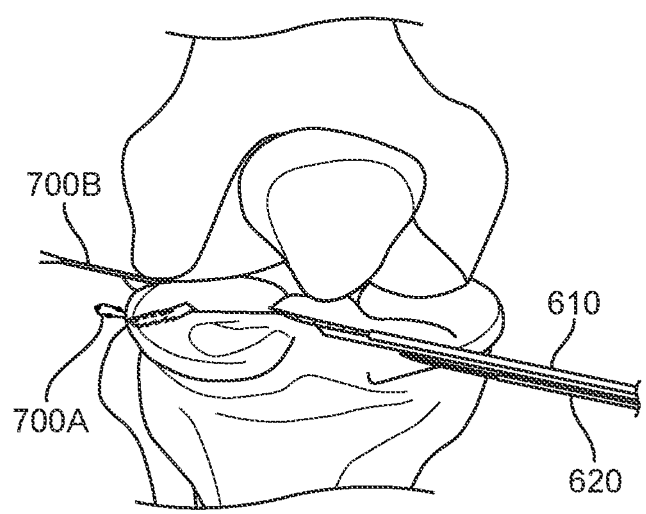
FIG. 14B shows a detailed perspective view of a fourth step in the second method of anchoring two portions of a soft tissue together, per one or more embodiments herein.
Figure 15:
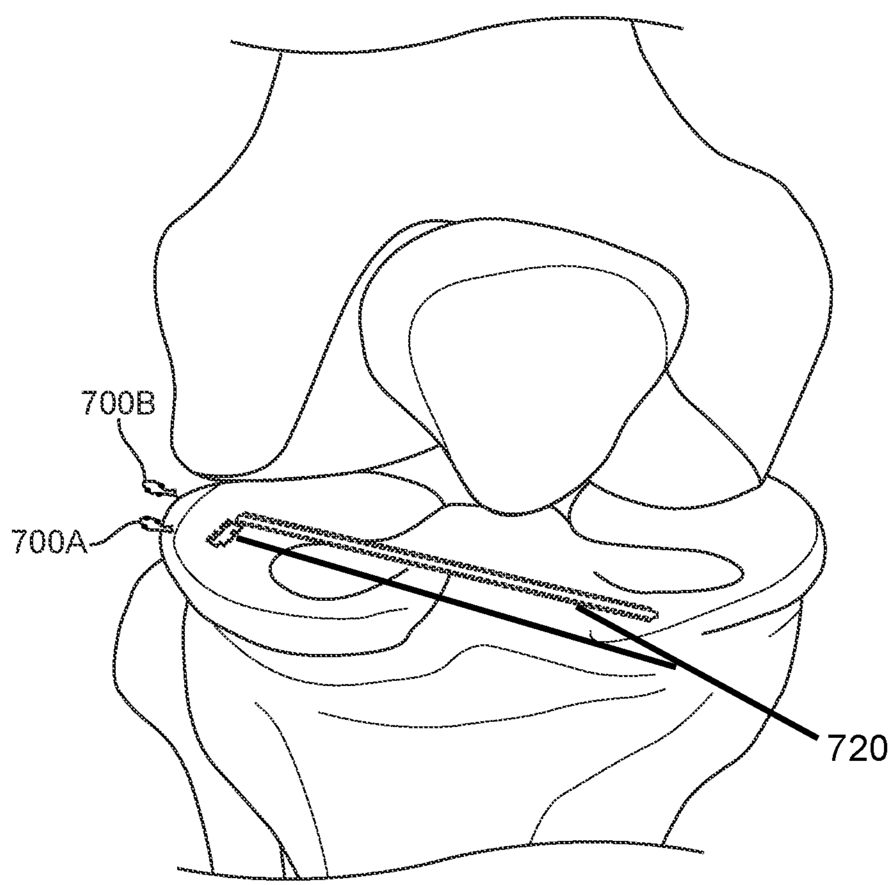
FIG. 15 shows a perspective view of a fifth step in the second method of anchoring two portions of a soft tissue together, per one or more embodiments herein.
Figure 16:
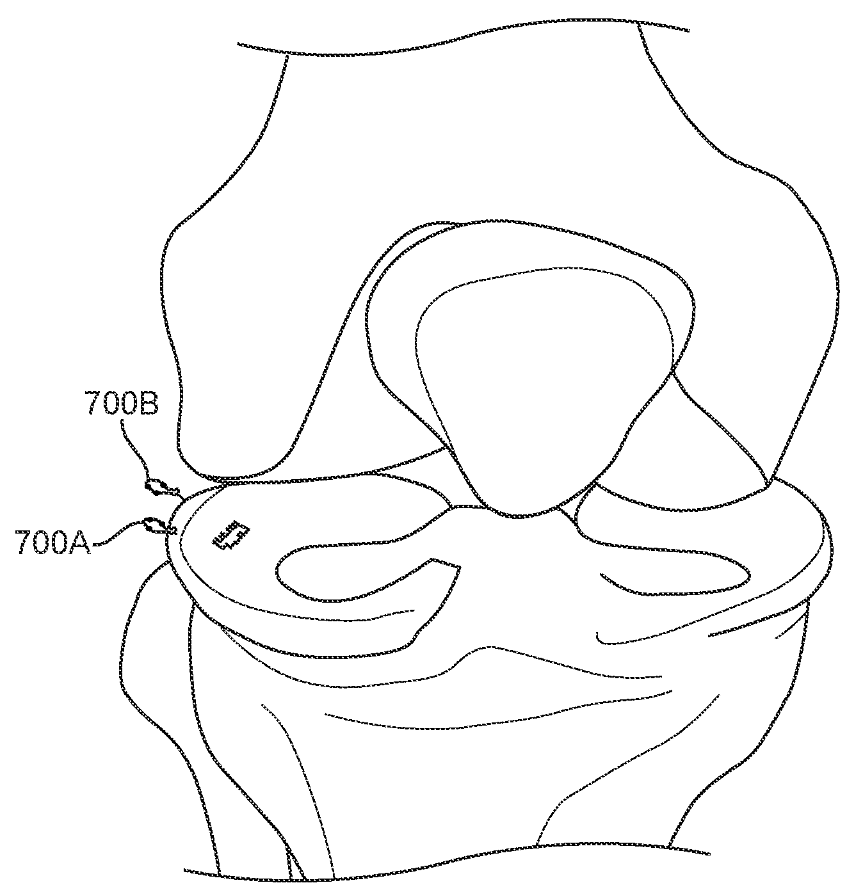
FIG. 16 shows a perspective view of a sixth step in the second method of two portions of a soft tissue together, per one or more embodiments herein.

In some embodiments, the second needle 620 is axially translatable within the second housing lumen 520 between a primary configuration, per FIGS. 9A and 10A, and a secondary configuration, per FIGS. 9B and 10B. In some embodiments, in the primary configuration, a distal point of the second needle 620 is proximal to a distal point of the first needle 610. In some embodiments, in the primary configuration, a distal point of the second needle 620 is distal to a distal point of the first needle 610. In some embodiments, a distal point of the second needle 620 is closer to a distal point of the housing 500 in the primary configuration than in the secondary configuration.

In some embodiments, the housing 500, the second needle 620 or both, comprise an indicator of the distance between the distal point of the housing 500 and the distal point of the second needle 620. In some embodiments, per FIGS. 10A and 10B, the suture inserter device 3000 further comprises a first needle slider 611 coupled to the first needle 610, second needle slider 621 coupled to the second needle 620, or both. In some embodiments, the first needle slider 611 translates the first needle 610 within the first housing lumen 510 between the first primary configuration and the first secondary configuration. In some embodiments, the second needle slider 621 translates the second needle 620 within the second housing lumen 520 between the second primary configuration and the second secondary configuration. In some embodiments, the first anchor insert 710A, the second anchor insert 710B, or both, have a diameter of less than about 5 mm.

Suture Anchors

Figure 18A:
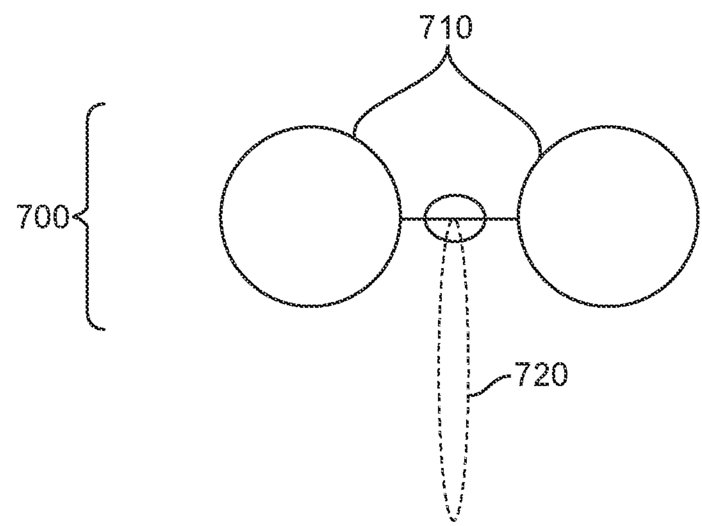
FIG. 18A shows an illustration of a first anchor, per one or more embodiments herein.
Figure 18B:
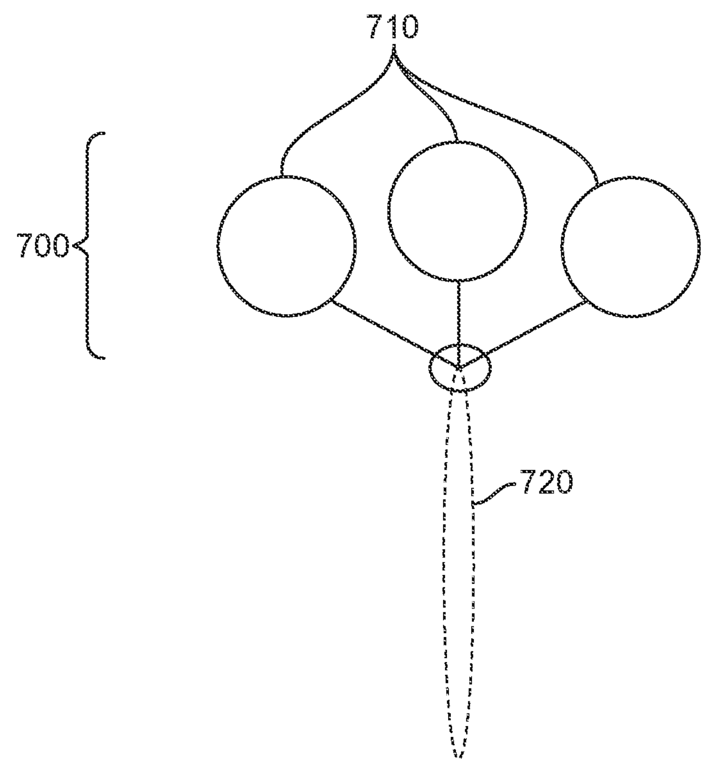
FIG. 18B shows an illustration of a second anchor, per one or more embodiments herein.

Provided herein, per FIGS. 8, 18A, and 18B, are suture anchors having a solid configuration. In some embodiments, each anchor (e.g., 700A, 700B) comprises a plurality of anchor inserts (e.g., 710A 710B). In some embodiments, each plurality of anchors inserts (e.g., 710A 710B) comprises 3, 4, 5, 6, 7, 8 or more anchor inserts. In some embodiments, for each plurality of anchor inserts, at least two of the anchor inserts are coupled. In one embodiment, any one anchor (e.g., 700A/700B) comprises 2, 3, 4, 5, 6, 7, 8, or more suture anchor inserts, wherein the anchor inserts are coupled to each other and the suture 720. In some embodiments, one or more anchors (e.g., 700A, 700B) have an insertion configuration, as described herein and a deployed configuration, as described herein. In some embodiments, the anchor inserts comprise one or more knots formed with a suture separate from the suture 720 (e.g., anchor suture, as described herein), wherein the link between the anchor inserts is the anchor suture itself. In some embodiments, a suture anchor system described herein comprises 1, 2, 3, 4, 5, or more anchors.

In some embodiments, the suture 720 comprises a repair suture and a separate deployment suture is used to transition the anchor 700 from an insertion configuration to a deployed configuration.

Method of Anchoring to a Bone

Another aspect provided herein is a method of anchoring to a bone, the method comprising: providing the first suturing system; inserting the inserter and the anchor into a hole in the bone; applying tension to the second end of the suture to alter the anchor from the insertion configuration to the deployed configuration; and axially translating the inserter with respect to the housing shaft from the distal position to the proximal position. In some embodiments, instead of applying tension to the second end of the suture, a deployment suture is provided and pulled to transition the anchor from an insertion configuration to a deployed configuration.

In some embodiments, the method further comprises trimming the suture, tightening the suture, locking the suture, or any combination thereof. In some embodiments, the hole in the bone has a depth of less than about 35 mm. In some embodiments, the hole in the bone has an inner diameter of less than about 5 mm. In some embodiments, an outer diameter of the housing is greater than the inner diameter of the hole. In some embodiments, the inserter is configured to enter at least partially within the bone hole.

In some embodiments, a method for inserting a suture for anchoring a soft tissue to a bone comprises providing a suture inserter device (e.g., first suturing system as described herein) having an anchor comprising a suture and one or more anchor inserts coupled to an inserter (as used herein, the term "inserter" and "driver" may be used interchangeably). In some embodiments, the inserter is in the distal position (e.g., FIG. 3A), such that the distal portion of the inserter extends from the housing shaft. In some embodiments, the anchor inserts are placed within the bone hole via an inserter fork 230 (as described herein). In some embodiments, the anchor inserts are placed within the bone hole in the insertion configuration. In some embodiments, the inserter is placed against the bone, wherein the inserter with the suture and anchor insert are inserted within the bone hole, wherein the anchor insert is in the insertion configuration (see FIG. 3A). In some embodiments, a deployment suture is provided, coupled to a leading anchor insert (e.g., anchor insert located deepest within the bone hole in FIG. 4A), wherein the deployment suture is configured to be pulled, and further configured to pull on the leading anchor insert, thereby transitioning the anchor from an insertion configuration to a deployed configuration. In some embodiments, one end of a suture is tensioned, or both ends of a suture are tensioned, so as to pull on the anchor inserts and transition the anchor from an insertion configuration to a deployed configuration. In some embodiments, the inserter fork is axially translatable, and configured to be retracted, for example into the inserter lumen 210, wherein the anchor inserts are configured to abut inserter 200 walls and thereby transition from an insertion configuration into a deployed configuration. In some embodiments, any one of the aforementioned methods for transitioning the anchor from an insertion configuration to a deployed configuration, either alone or in combination with another method, is used to transition the anchor from an insertion configuration to a deployed configuration.

In some embodiments, the inserter is axially translated proximally (i.e. out of the bone hole), as described herein). In some embodiments, the suture may be tensioned prior to and/or after the inserter has been axially translated.

In some embodiments, as the inserter is being axially translated out of the bone hole, it pulls on an end of the suture, such that the leading anchor insert (e.g., the anchor insert located deepest within the bone hole in FIG. 4A) is then pulled by the end of the suture being pulled, thereby transitioning the anchor insert from an insertion configuration to a deployed configuration (e.g., FIG. 4B). In some embodiments, the inserter continues to pull on the suture so as to tension the suture, and thereby further enabling the anchor insert to be in the deployed configuration.

In some embodiments, such a method provides an example of a suture secured by tying the two ends of the suture in a knot once passed through a respective tissue or other bone. In some embodiments, as described herein (see e.g., FIG. 19 as described herein), a knotless suture anchor insert may be used. In some embodiments, the inserter is initially in the proximal portion (e.g., FIG. 4B), and is translated into the distal position once the inserter is placed against the bone.

Method of Anchoring to a Bone Using a Knotless Suture Anchor System

Another aspect provided herein is a method of anchoring to a bone using a knotless suture system as described herein. With reference to FIGS. 19-21, the method comprises: providing a suture anchor 1900 with a passing suture 1930; inserting the inserter and the anchor 1900 into a hole in the bone; applying tension to the second end 1921 of the repair suture 1920 to alter the anchor 1900 from the insertion configuration to the deployed configuration; and axially translating the inserter with respect to the housing shaft from the distal position to the proximal position (as described herein). In some embodiments, applying tension to the second end 1921 of the repair suture comprises pulling the second end of the repair suture away from the bone hole. In some embodiments, instead of applying tension to the second end 1921 of the suture, a deployment suture is provided and pulled to transition the anchor from an insertion configuration to a deployed configuration.

In some embodiments, the method further comprises inserting the second end 1921 of the repair suture through a target tissue or a target bone; returning the second end 1921 of the repair suture towards the bone hole; coupling the second end 1921 with the suture loop 1932 of the passing suture 1930; tensioning (e.g., pulling) the secondary end 1931 of the passing suture 1930, such that the passing loop 1932 and second end 1921 of the repair suture are pulled within and then out of the repair suture 1920 (via the openings 1922, 1923); separating the second end 1921 of the repair suture from the suture loop 1932 (optionally outside the bone hole); and pulling to desired tension on the second end 1921. Accordingly, the repair suture 1920 is now secured within the bone hole, itself, and with a target tissue segment or target bone segment (due to the tension/friction of the repair suture within a hollow interior of itself, as described and depicted in FIGS. 20-21 herein).

In some embodiments, the method further comprises trimming the repair suture, tightening the repair suture, locking the repair suture, or any combination thereof. In some embodiments, the hole in the bone has a depth of less than about 35 mm. In some embodiments, the hole in the bone has an inner diameter of less than about 5 mm. In some embodiments, an outer diameter of the housing is greater than the inner diameter of the hole. In some embodiments, the inserter is configured to enter at least partially within the bone hole.

In some embodiments, a method for inserting a suture for anchoring a soft tissue to a bone comprises providing a suture inserter device (for e.g., first suturing system as described herein) having an anchor comprising a suture and one or more anchor inserts coupled to an inserter (as used herein, the term "inserter" and "driver" may be used interchangeably). In some embodiments, the inserter is in the distal position (e.g., FIG. 3A), such that the distal portion of the inserter extends from the housing shaft. In some embodiments, the anchor inserts are placed within the bone hole via an inserter fork 230 (as described herein). In some embodiments, the anchor inserts are placed within the bone hole in the insertion configuration. In some embodiments, the inserter is placed against the bone, wherein the inserter with the suture and anchor insert are inserted within the bone hole, wherein the anchor insert is in the insertion configuration (see FIG. 3A). In some embodiments, a deployment suture is provided, coupled to a leading anchor insert (e.g., anchor insert located deepest within the bone hole in FIG. 4A), wherein the deployment suture is configured to be pulled, and further configured to pull on the leading anchor insert, thereby transitioning the anchor from an insertion configuration to a deployed configuration. In some embodiments, one end of a suture is tensioned, or both ends of a suture are tensioned, so as to pull on the anchor inserts and transition the anchor from an insertion configuration to a deployed configuration. In some embodiments, the inserter fork is axially translatable, and configured to be retracted, for example into the inserter lumen 210, wherein the anchor inserts are configured to abut inserter 200 walls and thereby transition from an insertion configuration into a deployed configuration. In some embodiments, any one of the aforementioned methods for transitioning the anchor from an insertion configuration to a deployed configuration, either alone or in combination with another method, is used to transition the anchor from an insertion configuration to a deployed configuration.

In some embodiments, the inserter is axially translated proximally (i.e. out of the bone hole), as described herein). In some embodiments, the suture may be tensioned prior to and/or after the inserter has been axially translated.

In some embodiments, as the inserter is being axially translated out of the bone hole, it pulls on an end of the suture, such that the leading anchor insert (e.g., the anchor insert located deepest within the bone hole in FIG. 4A) is then pulled by the end of the suture being pulled, thereby transitioning the anchor insert from an insertion configuration to a deployed configuration (e.g., FIG. 4B). In some embodiments, the inserter continues to pull on the suture so as to tension the suture, and thereby further enabling the anchor insert to be in the deployed configuration.

In some embodiments, a knotless suture anchor insert may be used as described herein for any inserter described herein (see e.g., FIGS. 19-21 as described herein). In some embodiments, the inserter is initially in the proximal portion (e.g., FIG. 4B), and is translated into the distal position once the inserter is placed against the bone.

Method of Anchoring a First Soft Tissue Portion to a Second Soft Tissue Portion

Another aspect provided herein, per FIGS. 11A-16, is a first method of suturing a first soft tissue portion to a second soft tissue portion. In some embodiments, the method comprises: providing the second suturing system or third suturing system (e.g., comprising suture inserter device 2000 or 3000), piercing the soft tissue at a first side so as to be inserted through a first hole in the soft tissue (e.g., meniscus) with a needle (e.g., 610 or 620), per FIGS. 11A and 11B, and thereby inserting the first anchor 700A through the first hole in the insertion configuration, and exiting the soft tissue at a second side. With reference to FIGS. 12A-12B, the needle is translated within the housing lumen between the primary configuration and the secondary configuration (as described herein), such that the first anchor 700A remains on the second side of the soft tissue. In some embodiments, the first anchor 700A is pulled at least at an angle relative to a longitudinal axis of the needle (e.g., 610 or 620), such that the anchor 700A and corresponding anchor inserts are pulled against an angle of the first hole. Accordingly, in some cases, the anchor 700A will be refrained from passing through the first hole. In some cases, the anchor 700A remains in an insertion configuration. In some cases, the anchor 700A transitions from an insertion configuration to a deployed configuration (as described herein), and is thereby anchored to one side of the soft tissue (e.g., meniscus), while the needle translates away from the second side of the soft tissue. With reference to FIGS. 13A-13B, the second needle is inserted through another location of the soft tissue (or another soft tissue), thereby piercing the soft tissue and passing through a second hole in the tissue, thereby inserting the second anchor 700B through the second hole in the insertion configuration. With respect to FIGS. 14A-14B, applying tension to an end of the suture 720 enables the first anchor 700A and the second anchor 700B to transition from the insertion configuration to the deployed configuration. In some embodiments, the suture is tensioned while the second needle is inserted through the tissue portion. In some embodiments, the suture is tensioned after the second needle has been retracted and moved away from the soft tissue. With respect to FIG. 15, the second needle is pulled out through the second hole while the second anchor 700B remains deployed and anchored to the tissue, thereby separating the second needle and suture insertion device from the suture 720. In some embodiments, with respect to FIG. 16, the suture 720 is then trimmed.

In some embodiments, the suture anchor system 3000 is used, wherein instead of pulling out the second needle with the suture device, the second needle is transitioned from a primary configuration to a secondary configuration. In some embodiments, a diameter or width of the first hole and/or second hole in the soft tissue is at most about 3 mm, about 2 mm, or about 1 mm.

In some embodiments, the first portion of the soft tissue is a portion of a first soft tissue, and wherein the second soft tissue portion is a portion of a second soft tissue.

In some embodiments, a method of suturing a first soft tissue portion to a second soft tissue portion comprises: (a) receiving the third suturing system herein; (b) piercing the first soft tissue portion with the first needle in the primary configuration; (c) extracting the first needle from the first soft tissue portion; (d) translating the first needle within the first housing lumen to the first secondary configuration; (e) piercing the second soft tissue portion with the second needle; and (f) extracting the second needle from the second soft tissue portion.

In some embodiments, the method further comprises trimming the suture, tightening the suture, locking the suture, or any combination thereof. In some embodiments, step (e) is performed before step (d). In some embodiments, the method further comprises translating the secondary needle within the secondary housing lumen to the primary configuration, before or after step (f).

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less than the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A suturing system comprising:

(a) an anchor comprising:

(i) a suture having a first end and a second end; and (ii) a plurality of anchor inserts disposed along a portion of the suture between the first end and the second end;

the anchor configured to transition from an insertion configuration that is substantially linear to a deployed configuration that is at least partially nonlinear; and (b) a suture inserter device comprising:

(i) a housing comprising a housing lumen and a housing shaft disposed therein, wherein the housing shaft is axially translatable; and (ii) an inserter fork coupled to the housing shaft, wherein the inserter fork is axially translatable, via the housing shaft, between a distal position and a proximal position;

wherein each of the plurality of anchor inserts comprise an independently defined shape and are linked together, and wherein the plurality of inserts comprise a leading anchor insert that is configured to be displaced via the suture or a deployment suture, so as to transition the anchor from the insertion configuration to the deployed configuration.

2. The suturing system of claim 1, wherein the housing shaft has a shaft threaded portion, wherein the housing lumen has a lumen threaded portion complimentary to the shaft threaded portion, and wherein the housing shaft is axially translatable with respect to the housing lumen by rotating the shaft portion with respect to the lumen threaded portion.

3. The suturing system of claim 2, wherein the suture inserter device further comprises a handle rotatably coupled to the housing shaft, wherein the handle has a handle threaded portion complimentary to the shaft threaded portion, and wherein the shaft is axially translatable with respect to the housing lumen by rotating the handle with respect to the housing shaft.

4. The suturing system of claim 3, wherein the handle comprises a knurl, a knob, a textured surface, or any combination thereof.

5. The suturing system of claim 1, wherein the plurality of anchor inserts together, when in the insertion configuration or the deployed configuration, have span an outer width of less than about 5 mm.

6. The suturing system of claim 1, wherein the plurality of anchor inserts comprises a first anchor insert, a second anchor insert, and a link therebetween.

7. The suturing system of claim 6, wherein the first anchor insert and the second anchor insert are disposed in a substantially linear configuration from the first end to the second end of the suture when in the insertion configuration, and wherein the first anchor insert and the second anchor insert are disposed in a substantially non-linear configuration when in the deployed configuration.

8. The suturing system of claim 7, wherein the link changes shape from the substantially linear configuration to the substantially non-linear configuration in the deployed configuration of the anchor.

9. The suturing system of claim 7, wherein the anchor inserts are aligned in two or more rows when in the deployed configuration.

10. The suturing system of claim 7, wherein the first end of the suture is proximal to at least a portion of the plurality of anchor inserts when the anchor is in the insertion configuration.

11. The suturing system of claim 7, wherein the link comprises the suture.

12. The suturing system of claim 1, wherein each anchor insert has a shape comprising a sphere, a cylinder, a pyramid, a torus, a cone, a prism, or any combination thereof.

13. The suturing system of claim 1, wherein each anchor insert comprises a braided configuration.

14. The suturing system of claim 1, wherein the plurality of anchor inserts comprises 2, 3, 4, 5, 6, 7, 8 or more anchor inserts.

15. The suturing system of claim 1, wherein the inserter fork is disposed within an inserter lumen of an inserter.

16. The suturing system of claim 1, wherein the inserter comprises an inserter lumen therethrough, and wherein inserter lumen is sized to receive the first end of the suture the second end of the suture, or both.

17. A method of anchoring to a bone, the method comprising:

providing a suturing system comprising a. an anchor comprising:

i. a suture having a first end and a second end; and ii. a plurality of anchor inserts disposed along a portion of the suture between the first end and the second end, the anchor configured to transition from an insertion configuration that is substantially linear to a deployed configuration that is at least partially nonlinear, wherein each of the plurality of anchor inserts comprise an independently defined shape and are linked together, and wherein the plurality of inserts comprise a leading anchor insert that is configured to be displaced via the suture or a deployment suture, so as to transition the anchor from the insertion configuration to the deployed configuration; and b. a suture inserter device comprising:

i. a housing comprising a housing lumen and a housing shaft disposed therein, wherein the housing shaft is axially translatable; and ii. an inserter fork coupled to the housing shaft, wherein the inserter fork is axially translatable, via the housing shaft, between a distal position and a proximal position, inserting the inserter and the anchor into a hole partially in a bone hole of the bone, wherein the anchor is in the insertion configuration;

applying proximal tension to the first end of the suture or the deployment suture to transition the anchor from the insertion configuration to the deployed configuration; and axially translating the inserter with respect to the housing shaft from the distal position to the proximal position.

18. The method of claim 17, further comprising trimming the suture, tightening the suture, locking the suture, or any combination thereof.

19. The method of claim 17, wherein the hole in the bone has a depth of less than about 35 mm.

20. The method of claim 17, wherein an outer diameter of the housing is greater than the inner diameter of the hole.

* * * * *